United States Patent
Zhou et al.

(10) Patent No.: US 11,582,350 B2
(45) Date of Patent: Feb. 14, 2023

(54) POLICY CHARGING CONTROL AND SESSION MANAGEMENT INTERACTION METHOD, APPARATUS, AND SYSTEM

(71) Applicant: Huawei Technologies Co., Ltd., Shenzhen (CN)

(72) Inventors: Xiaoyun Zhou, Nanjing (CN); Yali Yan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 16/890,728

(22) Filed: Jun. 2, 2020

(65) Prior Publication Data
US 2020/0296221 A1    Sep. 17, 2020

Related U.S. Application Data

(63) Continuation of application No. PCT/CN2019/120415, filed on Nov. 22, 2019.

(30) Foreign Application Priority Data

Feb. 13, 2019   (CN) .......................... 201910116825.2

(51) Int. Cl.
*H04M 15/00*   (2006.01)
*H04W 28/02*   (2009.01)
*H04W 80/10*   (2009.01)

(52) U.S. Cl.
CPC ....... *H04M 15/66* (2013.01); *H04M 15/8016* (2013.01); *H04W 28/0268* (2013.01); *H04W 80/10* (2013.01)

(58) Field of Classification Search
CPC ............. H04M 15/66; H04M 15/8016; H04W 28/0268; H04W 80/10
See application file for complete search history.

(56) References Cited

U.S. PATENT DOCUMENTS 10,477,105 B2   11/2019  Ye et al.
2014/0334303 A1*  11/2014  Ma ..................... H04W 28/0268
370/235

(Continued)

FOREIGN PATENT DOCUMENTS

CN    109151913 A    1/2019
WO    2018205155 A1   11/2018

(Continued)

OTHER PUBLICATIONS

Ericsson, "23.501 clarification of Qos flows with signalled characteristics," SA WG2 Meeting #123, S2-178060, Oct. 23-27, 2017, 9 pages.

(Continued)

*Primary Examiner* — Pakee Fang
(74) *Attorney, Agent, or Firm* — Conley Rose, P.C.

(57) ABSTRACT

A policy control method, an apparatus, and a system, where the method includes: receiving, by a session management network element, a first message from a terminal device, where the first message includes a quality of service (QoS) rule identifier and a first operation indication; sending, by the session management network element, a second message to a policy control network element, where the second message includes a policy and charging control (PCC) rule identifier corresponding to the QoS rule identifier and a second operation indication corresponding to the first operation indication; and receiving, by the policy control network element, the second message, and performing, by the policy control network element on a PCC rule corresponding to the PCC rule identifier, a second operation indicated by the second operation indication.

24 Claims, 7 Drawing Sheets

(56) References Cited

U.S. PATENT DOCUMENTS

| | | | |
|---|---|---|---|
| 2018/0359189 A1* | 12/2018 | Ye | H04L 65/605 |
| 2019/0261211 A1 | 8/2019 | Wu et al. | |
| 2019/0357082 A1* | 11/2019 | Kim | H04L 12/1407 |
| 2020/0092424 A1* | 3/2020 | Qiao | H04M 15/8033 |
| 2020/0145884 A1* | 5/2020 | Guo | H04M 15/61 |

FOREIGN PATENT DOCUMENTS

| | | | |
|---|---|---|---|
| WO | 2018228032 A1 | 12/2018 | |
| WO | 2018233615 A1 | 12/2018 | |

OTHER PUBLICATIONS

3GPP TS 23.502 V15.4.1, "3rd Generation Partnership Project; Technical Specification Group Services and System Aspects; Procedures for the 5G System; Stage 2 (Release 15)," Jan. 2019, 347 pages.

3GPP TS 29.512 V15.2.0, "3rd Generation Partnership Project; Technical Specification Group Core Network and Terminals; 5G System; Session Management Policy Control Service; Stage 3 (Release 15)," Dec. 2018, 132 pages.

3GPP TS 24.501 V15.2.1, "3rd Generation Partnership Project; Technical Specification Group Core Network and Terminals; Non-Access-Stratum (NAS) protocol for 5G System (5GS); Stage 3 (Release 15)," Jan. 2019, 455 pages.

* cited by examiner

POLICY CHARGING CONTROL AND SESSION MANAGEMENT INTERACTION METHOD, APPARATUS, AND SYSTEM

CROSS-REFERENCE TO RELATED APPLICATIONS

This application is a continuation of International Patent Application No. PCT/CN2019/120415, filed on Nov. 22, 2019, which claims priority to Chinese Patent Application No. 201910116825.2, filed on Feb. 13, 2019. The disclosures of the aforementioned applications are hereby incorporated by reference in their entireties.

TECHNICAL FIELD

This application relates to the field of communications technologies, and in particular, to a policy control method, an apparatus, and a system.

BACKGROUND

Other approaches currently describe an interaction procedure between a session management function (SMF) network element and a policy control function (PCF) network element in a procedure in which a terminal device requests specific quality of service (QoS) handling for a selected service data flow (SDF). However, the interaction procedure is general and does not cover specific execution details. Consequently, the interaction procedure cannot be implemented.

In addition, other approaches specify implementation details of interaction between the terminal device and the SMF network element in the procedure in which the terminal device requests the specific QoS handling for the selected SDF. For example, FIG. 1A shows a data structure that is sent by a terminal device to an SMF network element and that is used to describe an SDF. The data structure includes a QoS rule information element (IE), a length of the QoS rule IE, and information used to describe one or more requested QoS rules. FIG. 1B shows a data structure of information used to describe each requested QoS rule. The data structure includes a QoS rule identifier, a length of a QoS rule, a rule operation code, a default QoS rule (DQR) bit, the number of packet filters, a packet filter list, QoS rule precedence, an idle bit, and a QoS flow identifier (QFI).

However, currently, based on the procedure in which the terminal device requests the specific QoS handling for the selected SDF and the implementation details of the interaction between the terminal device and the SMF network element in the procedure in which the terminal device requests the specific QoS handling for the selected SDF, there is still no related solution of supporting the interaction procedure between the SMF network element and the PCF network element.

SUMMARY

Embodiments of this application provide a policy control method, an apparatus, and a system, to support a session management network element to perform policy authorization for a policy control network element in a specific QoS handling procedure.

To achieve the foregoing objective, the following technical solutions are used in the embodiments of this application.

According to a first aspect, a policy control method is provided. The method includes: receiving, by a session management network element, a first message from a terminal device, where the first message includes a quality of service (QoS) rule identifier and a first operation indication; and sending, by the session management network element, a second message to a policy control network element, where the second message includes a policy and charging control (PCC) rule identifier corresponding to the QoS rule identifier and a second operation indication corresponding to the first operation indication, and is used to request the policy control network element to perform, on a PCC rule corresponding to the PCC rule identifier, a second operation indicated by the second operation indication. This solution provides an interaction procedure between the session management network element and the policy control network element in a specific QoS handling procedure. The session management network element may obtain the PCC rule identifier corresponding to the QoS rule identifier and the second operation indication corresponding to the first operation indication, and add the PCC rule identifier and the second operation indication to the second message sent to the policy control network element, such that the policy control network element can perform, on the PCC rule corresponding to the PCC rule identifier, the second operation indicated by the second operation indication. Therefore, based on this solution, in the specific QoS handling procedure, the session management network element may be supported to perform policy authorization for the policy control network element.

In a possible design, the first operation indication includes deleting a QoS rule, the second operation indication includes deleting a PCC rule, and the second operation indicated by the second operation indication includes an operation of deleting the PCC rule. Based on this solution, operations of deleting the QoS rule and the PCC rule can be implemented.

Optionally, the method further includes: receiving, by the session management network element, a third message from the policy control network element, where the third message includes the PCC rule identifier and first indication information, the first indication information indicates a deletion operation, and the third message is used to instruct the session management network element to delete the PCC rule; and sending, by the session management network element, a fourth message to the terminal device, where the fourth message includes the QoS rule corresponding to the PCC rule, the QoS rule includes the QoS rule identifier and the first operation indication, and the fourth message is used to instruct the terminal device to delete the QoS rule. Based on this solution, the session management network element can delete the corresponding PCC rule, and the terminal device can delete the corresponding QoS rule.

Optionally, the method further includes: determining, by the session management network element, to delete a QoS flow bound to the PCC rule. Correspondingly, the fourth message further includes first QoS flow description information, the first QoS flow description information includes an identifier of the QoS flow and second indication information, the second indication information is used to indicate deletion of the QoS flow, and the fourth message is further used to instruct the terminal device to delete the QoS flow. Based on this solution, the terminal device can delete the QoS flow bound to the PCC rule.

Optionally, the method further includes: determining, by the session management network element, to modify a QoS flow bound to the PCC rule. Correspondingly, the fourth message further includes second QoS flow description information, the second QoS flow description information includes an identifier of the QoS flow, third indication information, and an adjusted QoS parameter corresponding to the QoS flow, the third indication information indicates a modification operation, and the fourth message is further used to instruct the terminal device to modify the QoS flow based on the adjusted QoS parameter. Based on this solution, the terminal device can modify the QoS flow bound to the PCC rule.

In a possible design, the first operation indication includes modifying a QoS rule and adding a packet filter, the second operation indication includes modifying a PCC rule and adding a packet filter, and the second operation indicated by the second operation indication includes a modification operation of adding a packet filter to the PCC rule. Correspondingly, the first message further includes a first packet filter, and the second message further includes the first packet filter. Based on this solution, the modification operation of modifying a QoS rule and adding a packet filter and the modification operation of modifying a PCC rule and adding a packet filter can be implemented.

In a possible design, the first operation indication includes modifying a QoS rule and replacing a packet filter, the second operation indication includes modifying a PCC rule and replacing a packet filter, and the second operation indicated by the second operation indication includes a modification operation of replacing a packet filter within the PCC rule. Correspondingly, the first message further includes a first packet filter, and the second message further includes the first packet filter. Based on this solution, the modification operation of modifying a QoS rule and replacing a packet filter and the modification operation of modifying a PCC rule and replacing a packet filter can be implemented.

Optionally, the method further includes: receiving, by the session management network element, a fifth message from the policy control network element, where the fifth message includes a modified PCC rule, and the modified PCC rule includes the PCC rule identifier and the first packet filter, and the fifth message is used to instruct the session management network element to update, based on the modified PCC rule, the PCC rule corresponding to the PCC rule identifier; and sending, by the session management network element, a sixth message to the terminal device, where the sixth message includes a modified QoS rule corresponding to the modified PCC rule, the modified QoS rule includes the QoS rule identifier, the first operation indication, and a first packet filter set, the first packet filter set includes the first packet filter, and the sixth message is used to instruct the terminal device to update, based on the modified QoS rule, the QoS rule corresponding to the QoS rule identifier. Based on this solution, the session management network element can update the corresponding PCC rule, and the terminal device can update the corresponding QoS rule.

Optionally, the first message further includes a requested first QoS parameter, the second message further includes a second QoS parameter corresponding to the first QoS parameter, and the second QoS parameter is used to determine an adjusted second QoS parameter. Correspondingly, the modified PCC rule further includes the adjusted second QoS parameter. Correspondingly, the sixth message further includes third QoS flow description information, the third QoS flow description information includes an identifier of a QoS flow bound to the PCC rule, fourth indication information, and an adjusted first QoS parameter corresponding to the adjusted second QoS parameter, the fourth indication information indicates a modification operation, and the sixth message is further used to instruct the terminal device to modify the QoS flow based on the adjusted first QoS parameter. Based on this solution, the terminal device can modify the QoS flow bound to the PCC rule.

In a possible design, the first operation indication includes modifying a QoS rule and deleting a packet filter, the second operation indication includes modifying a PCC rule and deleting a packet filter, and the second operation indicated by the second operation indication includes a modification operation of deleting a packet filter within the PCC rule. Correspondingly, the first message further includes a first identifier of a to-be-deleted second packet filter, the second message further includes a second identifier of the second packet filter, the first identifier is used to identify the second packet filter within the QoS rule, and the second identifier is used to identify the second packet filter within the PCC rule. Based on this solution, the modification operation of modifying a QoS rule and deleting a packet filter and the modification operation of modifying a PCC rule and deleting a packet filter can be implemented.

Optionally, the method further includes: receiving, by the session management network element, a seventh message from the policy control network element, where the seventh message includes a modified PCC rule, the modified PCC rule includes the PCC rule identifier, the modified PCC rule does not include the second packet filter, and the seventh message is used to instruct the session management network element to update, based on the modified PCC rule, the PCC rule corresponding to the PCC rule identifier; and sending, by the session management network element, an eighth message to the terminal device, where the eighth message includes a modified QoS rule corresponding to the modified PCC rule, the modified QoS rule includes the QoS rule identifier, the first operation indication, and a second packet filter set, the second packet filter set does not include the second packet filter, and the eighth message is used to instruct the terminal device to update, based on the modified QoS rule, the QoS rule corresponding to the QoS rule identifier. Based on this solution, the session management network element can update the corresponding PCC rule, and the terminal device can update the corresponding QoS rule.

Optionally, the first message further includes a requested first QoS parameter, the second message further includes a second QoS parameter corresponding to the first QoS parameter, and the second QoS parameter is used to determine an adjusted second QoS parameter. Correspondingly, the modified PCC rule further includes the adjusted second QoS parameter. Correspondingly, the eighth message further includes fourth QoS flow description information, the fourth QoS flow description information includes an identifier of a QoS flow bound to the PCC rule, fifth indication information, and an adjusted first QoS parameter corresponding to the adjusted second QoS parameter, the fifth indication information indicates a modification operation, and the eighth message is further used to instruct the terminal device to modify the QoS flow based on the adjusted first QoS parameter. Based on this solution, the terminal device can modify the QoS flow bound to the PCC rule.

In a possible design, the first operation indication includes modifying a QoS rule but without modifying a packet filter, the second operation indication includes modifying a PCC rule but without modifying a packet filter, and the second operation indicated by the second operation indication includes an operation of modifying a QoS parameter within the PCC rule. Correspondingly, the first message further includes a requested first QoS parameter, the second message further includes a second QoS parameter corresponding to the first QoS parameter, and the second QoS parameter is used to determine an adjusted second QoS parameter. Based on this solution, the modification operation of modifying a QoS rule but without modifying a packet filter and the modification operation of modifying a PCC rule but without modifying a packet filter can be implemented.

Optionally, the method further includes: receiving, by the session management network element, a ninth message from the policy control network element, where the ninth message includes a modified PCC rule, the modified PCC rule includes the PCC rule identifier and the adjusted second QoS parameter, and the ninth message is used to instruct the session management network element to update, based on the modified PCC rule, the PCC rule corresponding to the PCC rule identifier; and sending, by the session management network element, a tenth message to the terminal device, where the tenth message includes fifth QoS flow description information, the fifth QoS flow description information includes an identifier of a QoS flow bound to the PCC rule, sixth indication information, and an adjusted first QoS parameter corresponding to the adjusted second QoS parameter, the sixth indication information indicates a modification operation, and the tenth message is used to instruct the terminal device to modify the QoS flow based on the adjusted first QoS parameter. Based on this solution, the terminal device can modify the QoS flow bound to the PCC rule.

In a possible design, before receiving, by a session management network element, a first message from a terminal device, the method further includes: receiving, by the session management network element, an eleventh message from the terminal device, where the eleventh message includes a third packet filter and a third operation indication, the third operation indication includes creating the QoS rule, and the eleventh message is used to instruct the session management network element to create the QoS rule; sending, by the session management network element, a twelfth message to the policy control network element, where the twelfth message includes the third packet filter and a fourth operation indication corresponding to the third operation indication, the fourth operation indication includes creating the PCC rule, and the twelfth message is used to instruct the policy control network element to create the PCC rule; receiving, by the session management network element, a thirteenth message from the policy control network element, where the thirteenth message includes the created PCC rule, the PCC rule includes the PCC rule identifier and the third packet filter, and the thirteenth message is used to instruct the session management network element to install the created PCC rule; and sending, by the session management network element, a fourteenth message to the terminal device, where the fourteenth message includes the created QoS rule corresponding to the PCC rule, the QoS rule includes the QoS rule identifier, the third operation indication, and a third packet filter set, the third packet filter set includes the third packet filter, and the fourteenth message is used to instruct the terminal device to install the created QoS rule. Based on this solution, operations of creating the QoS rule and the PCC rule can be implemented.

Optionally, the eleventh message further includes a requested third QoS parameter, the twelfth message further includes a fourth QoS parameter corresponding to the third QoS parameter, and the fourth QoS parameter is used to determine an adjusted fourth QoS parameter. Correspondingly, the created PCC rule further includes the adjusted fourth QoS parameter. Correspondingly, the fourteenth message further includes sixth QoS flow description information, the sixth QoS flow description information includes the identifier of the QoS flow bound to the PCC rule, seventh indication information, and an adjusted third QoS parameter corresponding to the adjusted fourth QoS parameter, the seventh indication information indicates a creation or modification operation, and the fourteenth message is further used to instruct the terminal device to modify the QoS flow based on the adjusted third QoS parameter. Based on this solution, the terminal device can modify the QoS flow bound to the PCC rule.

According to a second aspect, a communications apparatus is provided, to implement the foregoing methods. The communications apparatus may be the session management network element in the first aspect, or an apparatus including the session management network element. The communications apparatus includes a corresponding module, unit, or means for implementing the foregoing method. The module, unit, or means may be implemented by hardware or software, or implemented by hardware by executing corresponding software. The hardware or the software includes one or more modules or units corresponding to the foregoing functions.

According to a third aspect, a communications apparatus is provided, including a processor and a memory. The memory is configured to store a computer instruction. When the processor executes the instruction, the communications apparatus is enabled to perform the method in the first aspect. The communications apparatus may be the session management network element in the first aspect, or an apparatus including the session management network element.

According to a fourth aspect, a communications apparatus is provided, including a processor. The processor is configured to: be coupled to a memory; and after reading an instruction in the memory, perform the method in the first aspect according to the instruction. The communications apparatus may be the session management network element in the first aspect, or an apparatus including the session management network element.

According to a fifth aspect, a computer-readable storage medium is provided. The computer-readable storage medium stores an instruction. When the instruction is run on a computer, the computer is enabled to perform the method in the first aspect.

According to a sixth aspect, a computer program product including an instruction is provided. When the computer program product is run on a computer, the computer is enabled to perform the method in the first aspect.

According to a seventh aspect, a communications apparatus (for example, the communications apparatus may be a chip or a chip system) is provided. The communications apparatus includes a processor, configured to implement the functions in the first aspect. In a possible design, the communications apparatus further includes a memory. The memory is configured to store a necessary program instruction and necessary data. When the communications apparatus is a chip system, the communications apparatus may include a chip, or may include a chip and another discrete device.

In addition, for technical effects achieved in any design of the second to the seventh aspects, refer to technical effects achieved in different designs of the first aspect. Details are not described herein again.

According to an eighth aspect, a communications system is provided. The communications system includes a session management network element and a policy control network element. The session management network element is configured to receive a first message from a terminal device, where the first message includes a QoS rule identifier and a first operation indication. The session management network element is further configured to send a second message to the policy control network element, where the second message includes a PCC rule identifier corresponding to the QoS rule identifier and a second operation indication corresponding to the first operation indication. The policy control network element is configured to: receive the second message from the session management network element; and perform, on a PCC rule corresponding to the PCC rule identifier, a second operation indicated by the second operation indication.

In a possible design, the session management network element is further configured to perform the method in any possible design of the first aspect.

For technical effects achieved in any design of the eighth aspect, refer to technical effects achieved in different designs of the first aspect. Details are not described herein again.

DESCRIPTION OF EMBODIMENTS

The following describes the technical solutions in the embodiments of this application with reference to the accompanying drawings in the embodiments of this application. In descriptions of this application, unless otherwise specified, "/" indicates an "or" relationship between associated objects. For example, A/B may represent A or B. In this application, "and/or" merely describes an association relationship between associated objects and represents that three relationships may exist. For example, A and/or B may represent the following three cases: only A exists, both A and B exist, and only B exists, where A and B may be in a singular form or plural form. In addition, in the descriptions of this application, "a plurality of" means two or more than two. "At least one (one piece) of the following items" or a similar expression means any combination of the items, and includes any combination of one item (piece) or a plurality of items (pieces). For example, at least one (one piece) of a, b, or c may represent a, b, c, a combination of a and b, a combination of a and c, a combination of b and c, or a combination of a, b, and c, where a, b, and c may be in a singular or plural form. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not constitute a limitation on a quantity or an execution sequence, and that the terms such as "first" and "second" do not indicate a definite difference. In addition, in the embodiments of this application, the word such as "example" or "for example" is used to represent giving an example, an illustration, or a description. Any embodiment or design described as an "example" or "for example" in the embodiments of this application should not be interpreted as being more preferred or more advantageous than another embodiment or design. Rather, use of the word or phrase such as "example" or "for example" is intended to present a related concept in a manner for ease of understanding.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

Figure 1A:
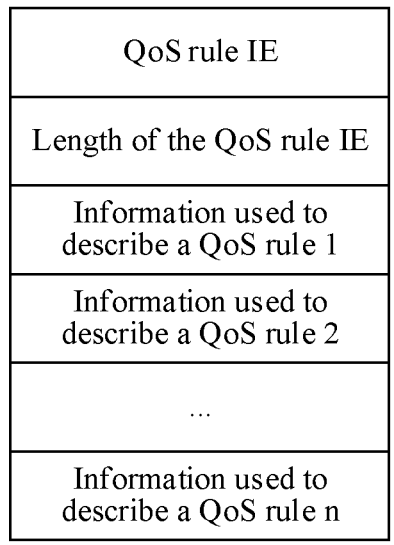
FIG. 1A shows an existing data structure that is sent by a terminal device to an SMF network element and that is used to describe an SDF.
Figure 1B:
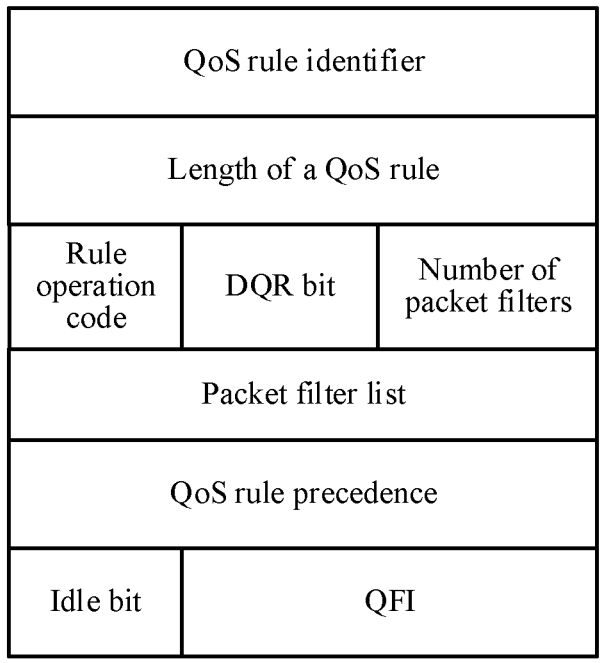
FIG. 1B shows an existing data structure of information used to indicate each requested QoS rule.
Figure 2:
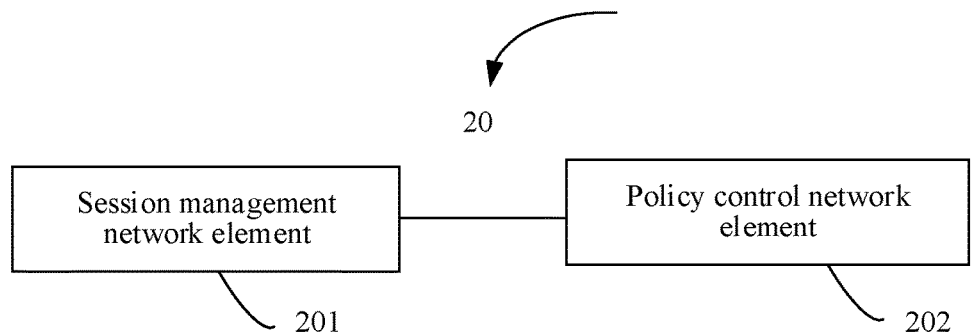
FIG. 2 is a schematic architectural diagram of a communications system according to an embodiment of this application.

FIG. 2 shows a communications system 20 according to an embodiment of this application. The communications system 20 includes a session management network element 201 and a policy control network element 202. The session management network element 201 receives a first message from a terminal device, where the first message includes a QoS rule identifier and a first operation indication, and is used to request the session management network element 201 to perform, on a QoS rule corresponding to the QoS rule identifier, a first operation indicated by the first operation indication. The session management network element 201 sends a second message to the policy control network element 202, where the second message includes a policy and charging control (PCC) rule identifier corresponding to the QoS rule identifier and a second operation indication corresponding to the first operation indication, and is used to request the policy control network element 202 to perform, on a PCC rule corresponding to the PCC rule identifier, a second operation indicated by the second operation indication. Then, the policy control network element 202 performs, on the PCC rule corresponding to the PCC rule identifier, the second operation indicated by the second operation indication. Example implementations of the solution are to be described in subsequent method embodiments. Details are not described herein. This solution provides an interaction procedure between the session management network element and the policy control network element in a specific QoS handling procedure. The session management network element may obtain the PCC rule identifier corresponding to the QoS rule identifier and the second operation indication corresponding to the first operation indication, and add the PCC rule identifier and the second operation indication to the second message sent to the policy control network element, such that the policy control network element can perform, on the PCC rule corresponding to the PCC rule identifier, the second operation indicated by the second operation indication. Therefore, based on this solution, in the specific QoS handling procedure, the session management network element may be supported to perform policy authorization for the policy control network element.

Optionally, in this embodiment of this application, the session management network element 201 and the policy control network element 202 may directly communicate with each other, or may communicate with each other through forwarding by another device. This is not specifically limited in this embodiment of this application.

Optionally, the communications system 20 shown in FIG. 2 may be applied to a fifth generation (5G) network under discussion, another future network, or the like. This is not specifically limited in this embodiment of this application.

Figure 3A:
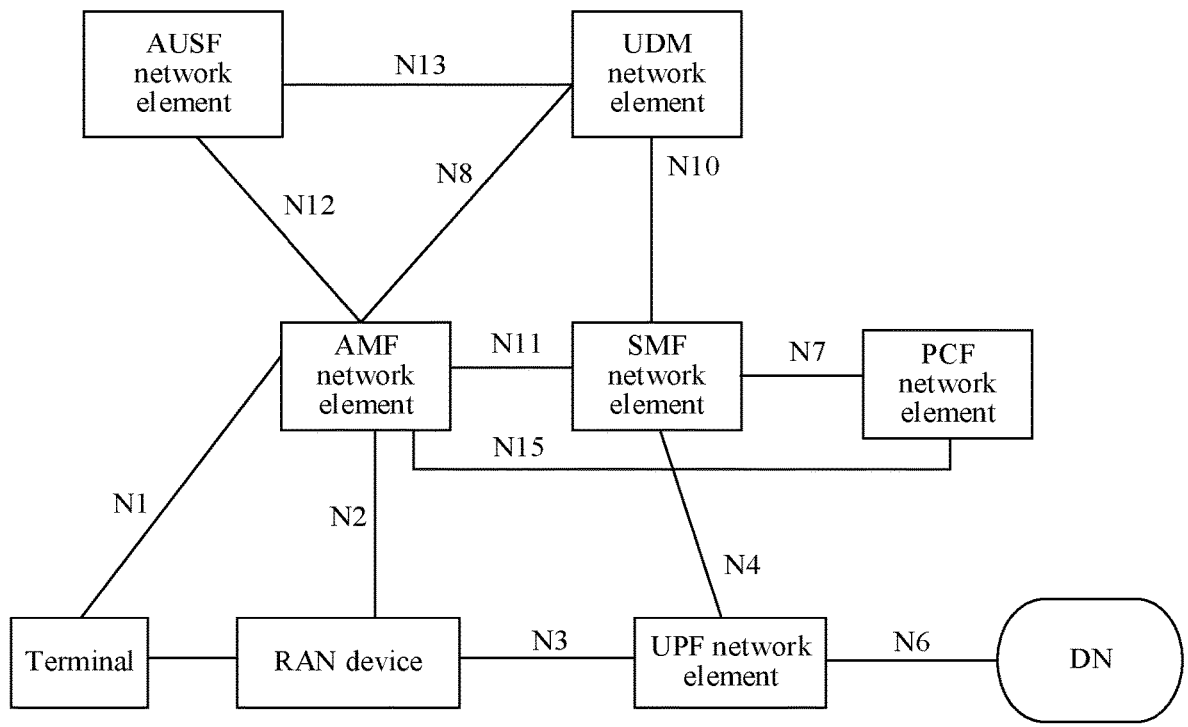
FIG. 3A shows a $5^{th}$ Generation (5G) network architecture 1 in a non-roaming scenario according to an embodiment of this application.

For example, it is assumed that the communications system 20 shown in FIG. 2 is applied to a 5G network architecture in a non-roaming scenario. As shown in FIG. 3A, a network element or an entity corresponding to the session management network element 201 may be an SMF network element in the non-roaming 5G network architecture, and a network element or an entity corresponding to the policy control network element 202 may be a PCF network element in the non-roaming 5G network architecture.

In addition, as shown in FIG. 3A, the non-roaming 5G network architecture may further include a radio access network (RAN) device, an access and mobility management function (AMF) network element, a user plane function (UPF) network element, a unified data management (UDM) network element, an authentication server function (AUSF) network element, and the like. This is not specifically limited in this embodiment of this application.

A terminal communicates with the AMF network element through a next generation (N) 1 interface (N1). The RAN device communicates with the AMF network element through an N2 interface (N2), and the RAN device communicates with the UPF network element through an N3 interface (N3). The UPF network element communicates with a data network (DN) through an N6 interface (N6). The AMF network element communicates with the SMF network element through an N11 interface (N11), the AMF network element communicates with the UDM network element through an N8 interface (N8), the AMF network element communicates with the AUSF network element through an N12 interface (N12), and the AMF network element communicates with the PCF network element through an N15 interface (N15). The SMF network element communicates with the PCF network element through an N7 interface (N7), the SMF network element communicates with the UPF network element through an N4 interface (N4), and the SMF network element communicates with the UDM network element through an N10 interface (N10). The UDM network element communicates with the AUSF network element through an N13 interface (N13).

Figure 3B:
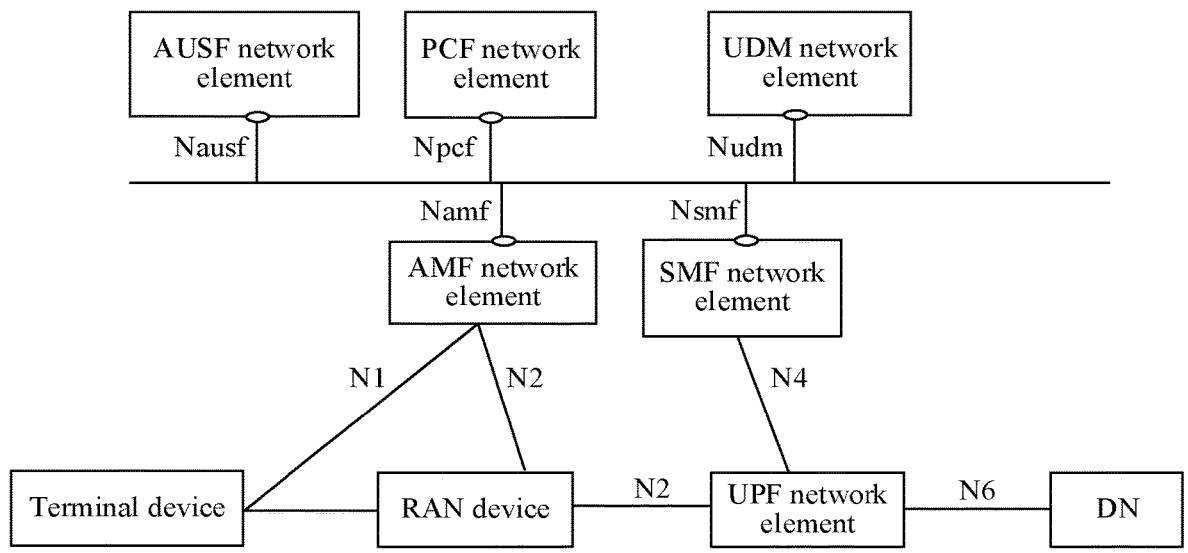
FIG. 3B shows a 5G network architecture 2 in a non-roaming scenario according to an embodiment of this application.

In addition, it should be noted that control plane network elements such as the AMF network element, the SMF network element, the UDM network element, the AUSF network element, and the PCF network element in the non-roaming 5G network architecture shown in FIG. 3A may alternatively interact with each other through a service-based interface. For example, as shown in FIG. 3B, a service-based interface externally provided by the AMF network element may be Namf, a service-based interface externally provided by the SMF network element may be Nsmf, a service-based interface externally provided by the UDM network element may be Nudm, a service-based interface externally provided by the PCF network element may be Npcf, and a service-based interface externally provided by the AUSF network element may be Nausf. For related descriptions, refer to a 5G system architecture in the standard Technical Specification (TS) 23.501. Details are not described herein.

Certainly, in FIG. 3A and FIG. 3B, that the communications system 20 is applied to the 5G network architecture in the non-roaming scenario is merely used as an example for description. The communications system 20 may be further applied to a 5G network architecture in a roaming scenario. This is not described herein using examples one by one.

Optionally, in the embodiments of this application, the terminal device may be a device configured to implement a wireless communication function, for example, a terminal or a chip that can be used in a terminal. The terminal may be a user equipment (UE), an access terminal, a terminal unit, a terminal station, a mobile station, a mobile console, a remote station, a remote terminal, a mobile device, a wireless communications device, a terminal agent, a terminal apparatus, or the like in a 5G system or a future evolved public land mobile network (PLMN). The access terminal may be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, or the like. The terminal may be mobile or fixed.

Optionally, in the embodiments of this application, the RAN device is a device that accesses a core network. For example, the RAN device may be a base station, a broadband network gateway (BNG), an aggregation switch, or a non-3rd generation partnership project (3GPP) access device. The base station may include base stations in various forms such as a macro base station, a micro base station (also referred to as a small cell), a relay station, and an access point.

Optionally, in this embodiment of this application, the session management network element or the policy control network element may also be referred to as a communications apparatus. The communications apparatus may be a general-purpose device or a dedicated device. This is not specifically limited in this embodiment of this application.

Optionally, in this embodiment of this application, a related function of the session management network element or the policy control network element may be implemented by one device, or may be jointly implemented by a plurality of devices, or may be implemented by one or more functional modules in one device. This is not specifically limited in this embodiment of this application. It may be understood that the foregoing function may be a network element on a hardware device, or may be a software function run on dedicated hardware, or may be a combination of hardware and software, or may be a virtualization function instantiated on a platform (for example, a cloud platform).

Figure 4:
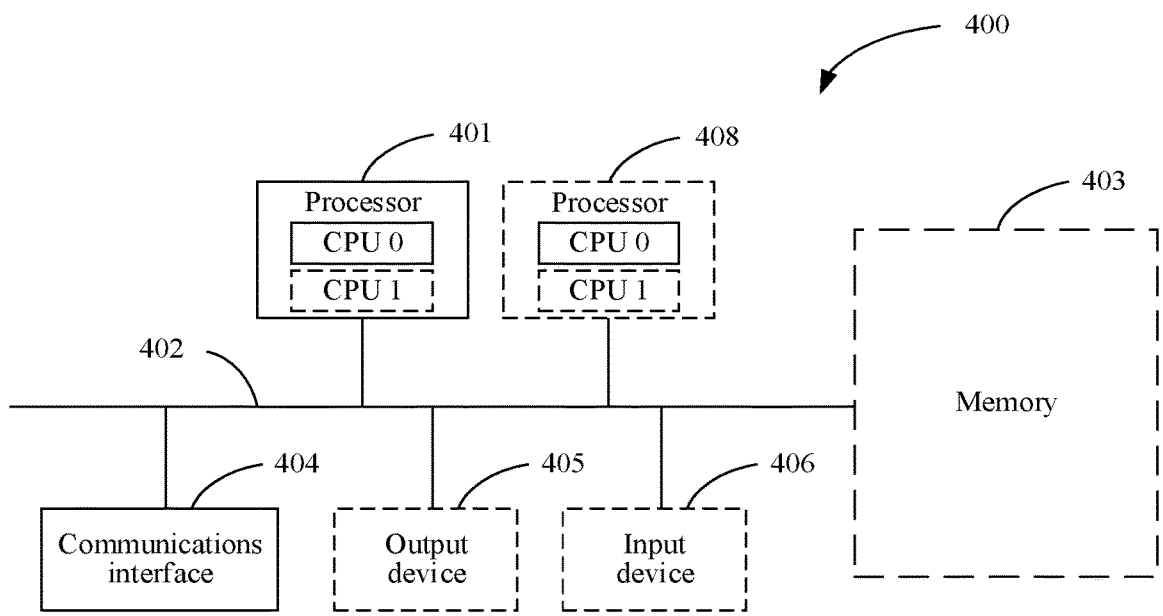
FIG. 4 is a schematic structural diagram of a communications device according to an embodiment of this application.

For example, in this embodiment of this application, a related function of the session management network element or the policy control network element may be implemented by a communications device 400 in FIG. 4. FIG. 4 is a schematic structural diagram of a communications device 400 according to an embodiment of this application. The communications device 400 includes one or more processors 401, a communications line 402, and at least one communications interface. In FIG. 4, that the communications device 400 includes one communications interface 404 and one processor 401 is merely used as an example for description. Optionally, the communications device 400 may further include a memory 403.

The processor 401 may be a general-purpose central processing unit (CPU), a microprocessor, an application-specific integrated circuit (ASIC), or one or more integrated circuits configured to control execution of a program in the solutions of this application.

The communications line 402 may include a channel to connect different components.

The communications interface 404 may be a transceiver module configured to communicate with another device or another communications network such as the Ethernet, a RAN, or a wireless local area network (WLAN). For example, the transceiver module may be an apparatus such as a transceiver or a transceiver component. Optionally, the communications interface 404 may be a transceiver circuit located inside the processor 401, to implement signal input and signal output of the processor.

The memory 403 may be an apparatus having a storage function. For example, the memory 403 may be a read-only memory (ROM) or another type of static storage device that can store static information and an instruction, or a random access memory (RAM) or another type of dynamic storage device that can store information and an instruction. The memory 403 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer, but is not limited thereto. The memory may exist independently and is connected to the processor using the communications line 402. The memory may alternatively be integrated with the processor.

The memory 403 is configured to store a computer-executable instruction for performing the solutions in this application, and execution of the computer-executable instruction is controlled by the processor 401. The processor 401 is configured to execute the computer-executable instruction stored in the memory 403, to implement a policy control method provided in the embodiments of this application.

Optionally, in this embodiment of this application, the processor 401 may perform related processing functions in the policy control method provided in the following embodiments of this application. The communications interface 404 is responsible for communicating with another device or another communications network. This is not specifically limited in this embodiment of this application.

Optionally, the computer-executable instruction in this embodiment of this application may also be referred to as application program code. This is not specifically limited in this embodiment of this application.

In an implementation, in an embodiment, the processor 401 may include one or more CPUs, for example, a CPU 0 and a CPU 1 in FIG. 4.

In an implementation, in an embodiment, the communications device 400 may include a plurality of processors, for example, the processor 401 and a processor 408 in FIG. 4. Each of the processors may be a single-core (single-CPU) processor or a multi-core (multi-CPU) processor. The processor herein may refer to one or more devices, circuits, and/or processing cores configured to process data (for example, a computer program instruction).

In an implementation, in an embodiment, the communications device 400 may further include an output device 405 and an input device 406. The output device 405 communicates with the processor 401, and may display information in a plurality of manners. For example, the output device 405 may be a liquid crystal display (LCD), a light-emitting diode (LED) display device, a cathode ray tube (CRT) display device, or a projector. The input device 406 communicates with the processor 401, and may receive an input of a user in a plurality of manners. For example, the input device 406 may be a mouse, a keyboard, a touchscreen device, or a sensor device.

The communications device 400 may also be referred to as a communications apparatus, and may be a general-purpose device or a dedicated device. For example, the communications device 400 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to a structure shown in FIG. 4. A type of the communications device 400 is not limited in this embodiment of this application.

A policy control method provided in the embodiments of this application is described below in detail with reference to FIG. 2 to FIG. 4.

It should be noted that names of messages between network elements in the following embodiments of this application, names of parameters in the messages, or the like are merely examples, and there may be other names in an implementation. This is not specifically limited in the embodiments of this application.

Figure 5:
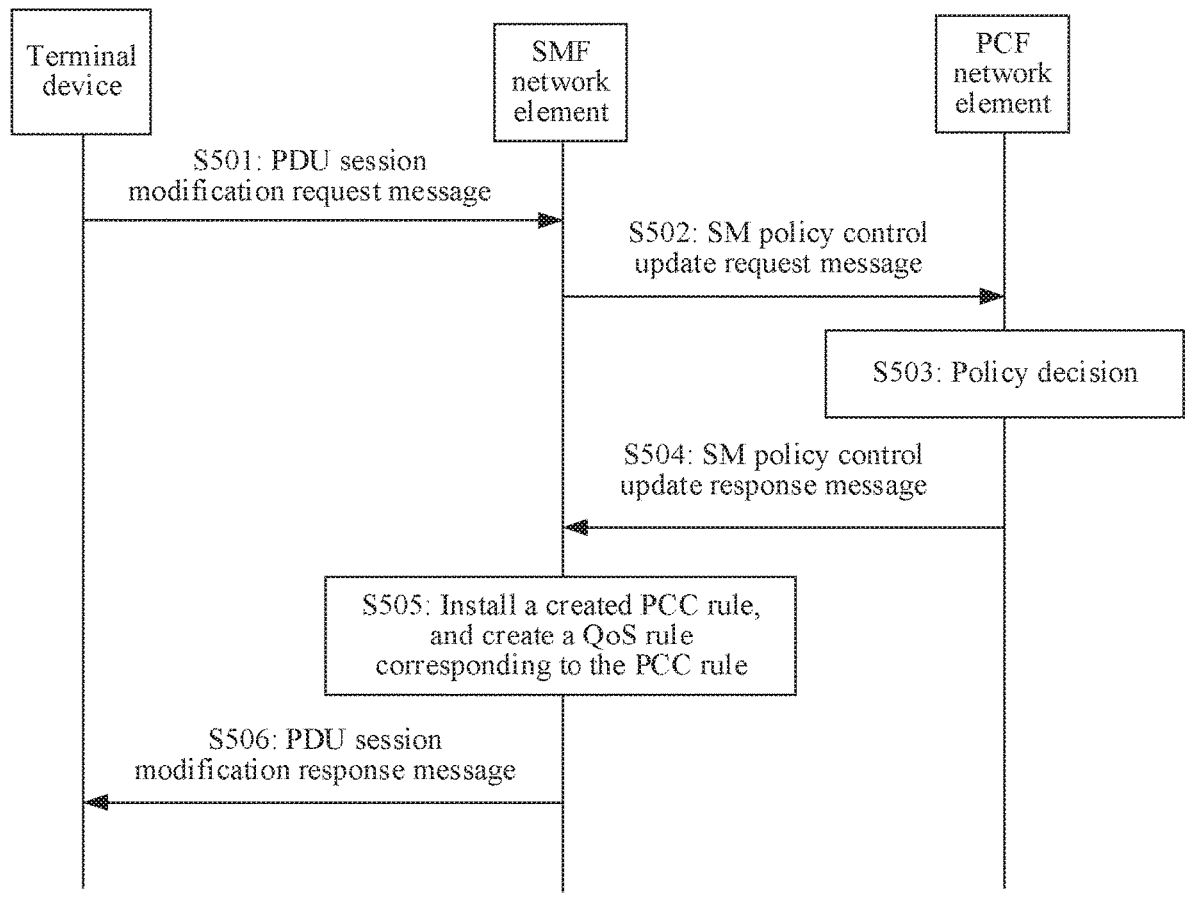
FIG. 5 is a schematic flowchart 1 of a policy control method according to an embodiment of this application.

First, for example, the communications system shown in FIG. 2 is applied to the 5G network architecture in the non-roaming scenario shown in FIG. 3A or FIG. 3B, and an operation indication requested by a terminal device from an SMF network element is creating a QoS rule ("Create new QoS rule"). FIG. 5 shows a policy control method according to an embodiment of this application. The policy control method includes the following steps.

S501: The terminal device sends a first message 1 to the SMF network element, and the SMF network element receives the first message 1 from the terminal device.

For example, the message first 1 may be a protocol data unit (PDU) session modification request message in FIG. 5.

The first message 1 includes information used to indicate a requested QoS rule, and is used to instruct the SMF network element to create the requested QoS rule. The information used to indicate the requested QoS rule may include, for example, a packet filter (which is denoted as a packet filter 1 herein) used to describe an SDF and an operation indication 1 (which may also be referred to as an operation code 1) "Create new QoS rule".

Optionally, if the terminal device allocates a QoS rule packet filter identifier 1 to the packet filter 1, the first message 1 may further include the QoS rule packet filter identifier 1.

Optionally, the first message 1 may further include a requested QoS parameter (which is denoted as a QoS parameter 1 herein). The QoS parameter 1 is a QoS parameter corresponding to a requested QoS flow. For example, the QoS parameter 1 may include a requested 5G QoS identifier (5QI). Optionally, if the requested 5QI is in guaranteed bit rate (GBR) type, the QoS parameter 1 may further include a requested GBR.

S502: The SMF network element sends a second message 2 to a PCF network element, and the PCF network element receives the second message 2 from the SMF network element.

For example, the second message 2 may be, for example, a session management (SM) policy control update request message in FIG. 5.

The second message 2 includes the packet filter 1 and an operation indication 2 (which may also be referred to as an operation code 2) "Create new PCC rule" corresponding to the operation indication 1, and is used to instruct the PCF network element to create a PCC rule.

Optionally, if the first message 1 includes the QoS parameter 1, the second message 2 may further include a QoS parameter 2 corresponding to the QoS parameter 1, and the QoS parameter 2 is a QoS parameter corresponding to the requested PCC rule. For example, the QoS parameter 2 may include, for example, the requested 5QI in the QoS parameter 1 and a requested GBR calculated by the SMF network element. If the QoS flow corresponding to the QoS parameter 1 requested by the terminal device does not exist, the requested GBR calculated by the SMF network element is equal to the GBR in the QoS parameter 1. Otherwise, the SMF network element calculates a GBR in the QoS parameter 2 based on a difference between a GBR of an authorized QoS flow and the requested GBR in the QoS parameter 1.

S503: The PCF network element makes a policy decision.

The PCF network element may create the PCC rule based on the second message 2. The PCC rule may include a PCC rule identifier and an SDF template. The SDF template includes the packet filter 1 and a PCC rule packet filter identifier 1 allocated by the PCF network element to the packet filter 1.

Optionally, if the second message 2 further includes the QoS parameter 2, the PCF network element may further determine an adjusted QoS parameter (which may also be described as an authorized QoS parameter and is denoted as a QoS parameter 3). The PCC rule may further include the QoS parameter 3. For example, the QoS parameter 3 may include, for example, a 5QI and an allocation and retention priority (ARP). Optionally, if the QoS parameter 2 further includes the requested GBR, the QoS parameter 3 further includes the requested GBR and a maximum bit rate (MBR). The MBR may be determined based on a policy. For example, the MBR may be equal to the requested GBR. This is not specifically limited in this embodiment of this application.

S504: The PCF network element sends a third message 3 to the SMF network element, and the SMF network element receives the third message 3 from the PCF network element.

For example, the third message 3 may be, for example, an SM policy control update response message in FIG. 5.

The third message 3 may include the created PCC rule, and the third message 3 is used to instruct the SMF network element to install the created PCC rule.

S505: The SMF network element installs the created PCC rule, and creates the QoS rule corresponding to the PCC rule.

In addition, in this embodiment of this application, the SMF network element may further perform QoS flow binding based on the PCC rule. For example, if the SMF network element needs to create a new QoS flow, the SMF network element allocates a QoS flow identifier (QFI) to the newly created QoS flow, and binds the newly created PCC rule to the newly created QoS flow. Alternatively, if the SMF network element does not need to create a new QoS flow, the SMF network element binds the newly created PCC rule to an existing QoS flow.

In this embodiment of this application, the QoS rule may include a QoS rule identifier, the operation indication 1 "Create new QoS rule", a packet filter set 1, and an identifier (that is, a QFI) of the QoS flow bound to the PCC rule, and the packet filter set 1 includes the packet filter 1 and the QoS rule packet filter identifier 1 allocated by the SMF network element or the terminal device to the packet filter 1.

Optionally, in this embodiment of this application, if the PCC rule includes the QoS parameter 3, the SMF network element may further determine a QoS parameter 4 corresponding to the QoS parameter 3. The QoS parameter 4 corresponds to the QoS flow bound to the PCC rule. For example, the QoS parameter 4 may include, for example, the 5QI and the ARP. Optionally, if the PCC rule further includes the GBR, the QoS parameter 4 may further include the GBR calculated by the SMF network element. Alternatively, if the PCC rule further includes the MBR, the QoS parameter 4 may further include an MBR calculated by the SMF network element. The calculated GBR is a sum of GBRs of all PCC rules bound to the QoS flow, and the calculated MBR is a sum of MBRs of all the PCC rules bound to the QoS flow.

Optionally, in this embodiment of this application, the SMF network element may store a correspondence between the PCC rule identifier and the QoS rule, and a correspondence between the PCC rule packet filter identifier 1 and the QoS rule packet filter identifier 1. This is not specifically limited herein.

S506: The SMF network element sends a fourth message 4 to the terminal device, and the terminal device receives the fourth message 4 from the SMF network element.

For example, the fourth message 4 may be a PDU session modification response message in FIG. 5.

The fourth message 4 includes the created QoS rule, and is used to instruct the terminal device to install the QoS rule.

Optionally, if the SMF network element can determine the QoS parameter 4 corresponding to the QoS parameter 3, the fourth message 4 may further include QoS flow description information 1. The QoS flow description information 1 includes the QoS parameter 4, the identifier (that is, the QFI) of the QoS flow bound to the PCC rule, and indication information 1. The indication information 1 indicates a creation or modification operation. The QoS flow description information 1 is used to instruct the terminal device to create or modify, based on the QoS parameter 4, the QoS flow bound to the PCC rule.

After receiving the fourth message 4 from the SMF network element, the terminal device may install the corresponding QoS rule based on the fourth message 4. Optionally, if the terminal device may obtain the QoS flow description information 1, the terminal device may create or modify, based on the QoS parameter 4 in the QoS flow description information 1, the QoS flow bound to the PCC rule. This is not specifically limited herein.

The embodiment shown in FIG. 5 provides an interaction procedure between the SMF network element and the PCF network element in a specific QoS handling procedure. The SMF network element may obtain the PCC rule identifier corresponding to the QoS rule identifier and the operation indication "Create new PCC rule" corresponding to the operation indication "Create new QoS rule", and add the PCC rule identifier and the operation indication "Create new PCC rule" to the second message 2 sent to the PCF network element, such that the PCF network element can create, based on the second message 2, the PCC rule corresponding to the PCC rule identifier. Therefore, the policy control method provided in this embodiment of this application can support the SMF network element to perform policy authorization for the PCF network element in the specific QoS handling procedure.

The actions of the PCF network element or the actions of the SMF network element in steps S501 to S506 may be performed by the processor 401 of the communications device 400 shown in FIG. 4 by invoking the application program code stored in the memory 403. This is not limited in this embodiment.

Figure 6:
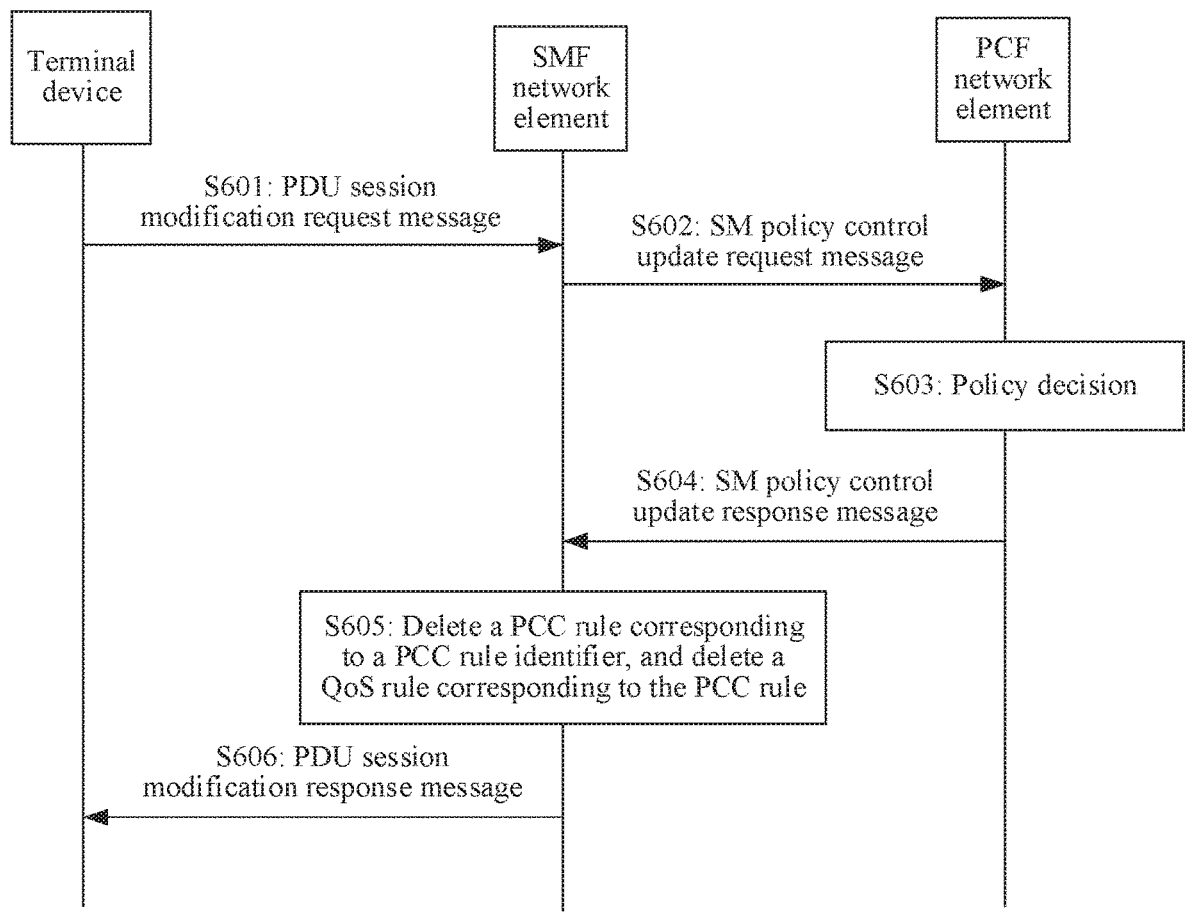
FIG. 6 is a schematic flowchart 2 of a policy control method according to an embodiment of this application.

Alternatively, for example, the communications system shown in FIG. 2 is applied to the 5G network architecture in the non-roaming scenario shown in FIG. 3A or FIG. 3B, and an operation indication requested by a terminal device from an SMF network element is deleting a QoS rule ("Delete existing QoS rule"). FIG. 6 shows a policy control method according to an embodiment of this application. The policy control method includes the following steps.

S601: The terminal device sends a first message 1 to the SMF network element, and the SMF network element receives the first message 1 from the terminal device.

For example, the first message 1 may be, for example, a PDU session modification request message in FIG. 6.

The first message 1 includes information used to indicate a requested QoS rule, and is used to instruct the SMF network element to delete the requested QoS rule. The information used to indicate the requested QoS rule may include, for example, an operation indication 3 (which may also be referred to as an operation code 3) "Delete existing QoS rule" and a corresponding QoS rule identifier.

S602: The SMF network element sends a second message 2 to a PCF network element, and the PCF network element receives the second message 2 from the SMF network element.

For example, the second message 2 may be, for example, an SM policy control update request message in FIG. 6.

The second message 2 includes a PCC rule identifier corresponding to the QoS rule identifier, and an operation indication 4 (which may also be referred to as an operation code 4) "Delete existing PCC rule" corresponding to the operation indication 3, and is used to instruct the PCF network element to delete a PCC rule corresponding to the PCC rule identifier.

S603: The PCF network element makes a policy decision.

The PCF network element may determine, based on the second message 2, to delete the PCC rule corresponding to the PCC rule identifier, and further delete the PCC rule corresponding to the PCC rule identifier.

S604: The PCF network element sends a third message 3 to the SMF network element, and the SMF network element receives the third message 3 from the PCF network element.

For example, the third message 3 may be, for example, an SM policy control update response message in FIG. 6.

The third message 3 may include the PCC rule identifier and indication information 2, the indication information 2 indicates a deletion operation, and the third message 3 is used to instruct the SMF network element to delete the PCC rule corresponding to the PCC rule identifier.

S605: The SMF network element deletes the PCC rule corresponding to the PCC rule identifier, and deletes the QoS rule corresponding to the PCC rule.

S606: The SMF network element sends a fourth message 4 to the terminal device, and the terminal device receives the fourth message 4 from the SMF network element.

For example, the fourth message 4 may be, for example, a PDU session modification response message in FIG. 6.

The fourth message 4 includes the QoS rule corresponding to the PCC rule, the QoS rule includes the QoS rule identifier and the operation indication 3 "Delete existing QoS rule", and the fourth message 4 is used to instruct the terminal device to delete the QoS rule corresponding to the QoS rule identifier.

After receiving the fourth message 4 from the SMF network element, the terminal device may delete the corresponding QoS rule based on the fourth message 4.

In addition, optionally, the SMF network element may further determine to delete a QoS flow bound to the PCC rule. Correspondingly, the fourth message 4 may further include QoS flow description information 2, the QoS flow description information 2 includes an identifier of the QoS flow bound to the PCC rule and indication information 3, and the indication information 3 is used to indicate deletion of the corresponding QoS flow. Further, after obtaining the QoS flow description information 2, the terminal device may delete the corresponding QoS flow based on the QoS flow description information 2. This is not specifically limited herein.

Optionally, the SMF network element may further determine to modify a QoS flow bound to the PCC rule. Correspondingly, the fourth message 4 may further include QoS flow description information 3, the QoS flow description information 3 includes an identifier of the QoS flow bound to the PCC rule, indication information 4, and an adjusted QoS parameter, and the indication information 4 is used to indicate modification of the corresponding QoS flow. Further, after obtaining the QoS flow description information 3, the terminal device may modify the corresponding QoS flow based on the adjusted QoS parameter in the QoS flow description information 3. This is not specifically limited herein.

The embodiment shown in FIG. 6 provides an interaction procedure between the SMF network element and the PCF network element in a specific QoS handling procedure. The SMF network element may obtain the PCC rule identifier corresponding to the QoS rule identifier and the operation indication "Delete existing PCC rule" corresponding to the operation indication "Delete existing QoS rule", and add the PCC rule identifier and the operation indication "Delete existing PCC rule" to the second message 2 sent to the PCF network element, such that the PCF network element can delete, based on the second message 2, the PCC rule corresponding to the PCC rule identifier. Therefore, the policy control method provided in this embodiment of this application can support the SMF network element to perform policy authorization for the PCF network element in the specific QoS handling procedure.

The actions of the PCF network element or the actions of the SMF network element in steps S601 to S606 may be performed by the processor 401 of the communications device 400 shown in FIG. 4 by invoking the application program code stored in the memory 403. This is not limited in this embodiment.

Figure 7:
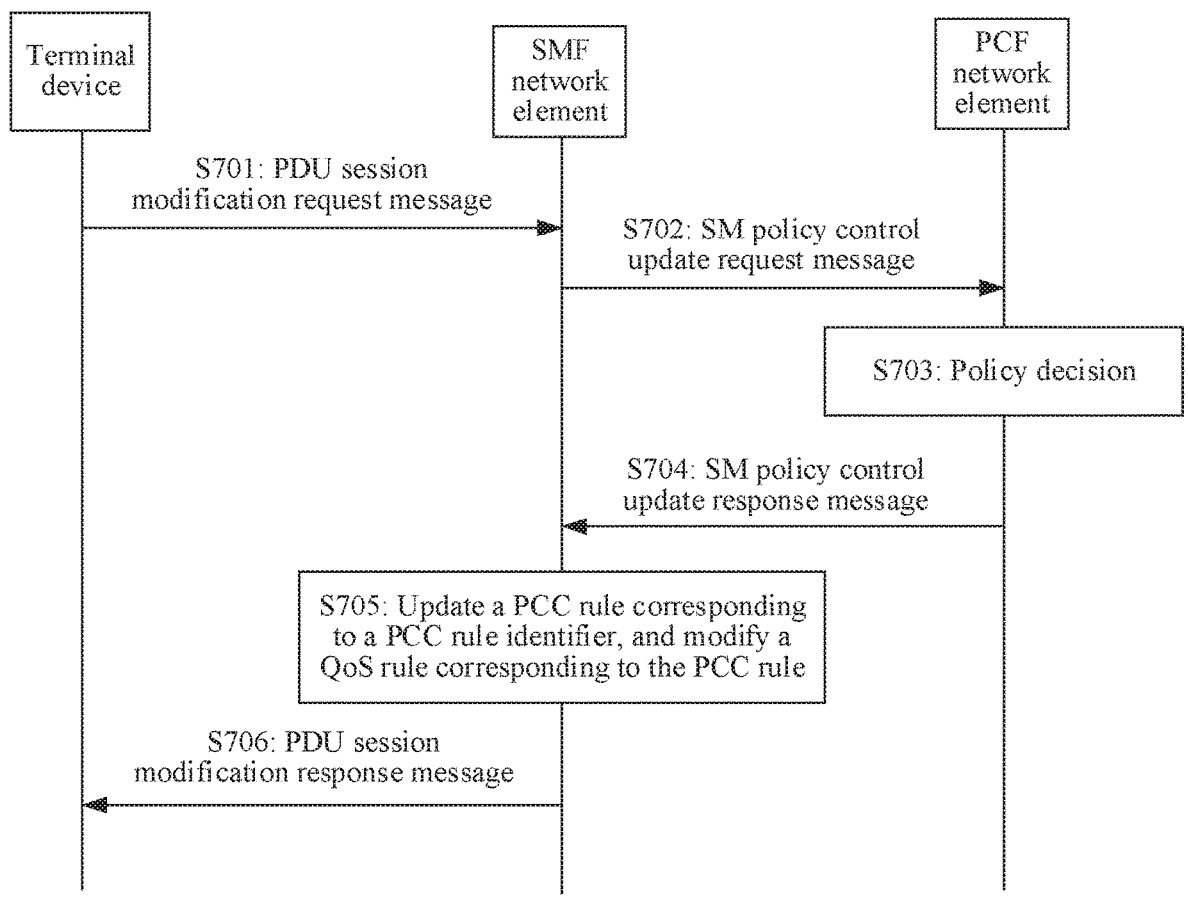
FIG. 7 is a schematic flowchart 3 of a policy control method according to an embodiment of this application.

Alternatively, for example, the communications system shown in FIG. 2 is applied to the 5G network architecture in the non-roaming scenario shown in FIG. 3A or FIG. 3B, and an operation indication requested by a terminal device from an SMF network element is modifying a QoS rule and adding/replacing/deleting a packet filter ("Modify existing QoS rule and add/replace/delete packet filters"). FIG. 7 shows a policy control method according to an embodiment of this application. The policy control method includes the following steps.

S701: The terminal device sends a first message 1 to the SMF network element, and the SMF network element receives the first message 1 from the terminal device.

For example, the first message 1 may be, for example, a PDU session modification request message in FIG. 7.

The first message 1 includes information used to indicate a requested QoS rule, and is used to instruct the SMF network element to perform a modification operation of adding/replacing/deleting a packet filter within the QoS rule.

Optionally, if the operation indication requested by the terminal device from the SMF network element is modifying a QoS rule and adding a packet filter ("Modify existing QoS rule and add packet filters"), the information used to indicate the requested QoS rule may include, for example, an operation indication 5 (which may also be referred to as an operation code 5) "Modify existing QoS rule and add packet filters", a corresponding QoS rule identifier, and a packet filter (which is denoted as a packet filter 2 herein) that is requested to be newly added and that is used to describe an SDF. Optionally, if the terminal device allocates a QoS rule packet filter identifier 2 to the packet filter 2, the first message 1 may further include the QoS rule packet filter identifier 2.

Optionally, if the operation indication requested by the terminal device from the SMF network element is modifying a QoS rule and replacing a packet filter ("Modify existing QoS rule and replace packet filters"), the information used to indicate the requested QoS rule may include, for example, an operation indication 7 (which may also be referred to as an operation code 7) "Modify existing QoS rule and replace packet filters", a corresponding QoS rule identifier, and a packet filter (which is denoted as a packet filter 3 herein) used to replace an existing packet filter within the QoS rule. Optionally, if the terminal device allocates a QoS rule packet filter identifier 3 to the packet filter 3, the first message 1 may further include the QoS rule packet filter identifier 3.

Optionally, if the operation indication requested by the terminal device from the SMF network element is modifying a QoS rule and deleting a packet filter ("Modify existing QoS rule and delete packet filters"), the information used to indicate the requested QoS rule may include, for example, an operation indication 9 (which may also be referred to as an operation code 9) "Modify existing QoS rule and delete packet filters", a corresponding QoS rule identifier, and a first identifier of a to-be-deleted packet filter. It is assumed herein that the to-be-deleted packet filter is a packet filter 1, the first identifier of the to-be-deleted packet filter is a QoS rule packet filter identifier 1 allocated by the SMF network element or the terminal device to the packet filter 1.

Optionally, the first message 1 may further include a requested QoS parameter (which is denoted as a QoS parameter 1 herein). For a related description of the QoS parameter 1, refer to the description in the embodiment shown in FIG. 5. Details are not described herein again.

S702: The SMF network element sends a second message 2 to a PCF network element, and the PCF network element receives the second message 2 from the SMF network element.

For example, the second message 2 may be, for example, an SM policy control update request message in FIG. 7.

Optionally, if the terminal device requests the operation indication 5 from the SMF network element, the second message 2 includes a PCC rule identifier corresponding to the QoS rule identifier, the packet filter 2, and an operation indication 6 (which may also be referred to as an operation code 6) "Modify existing PCC rule and add packet filters" corresponding to the operation indication 5, and is used to instruct the PCF network element to perform a modification operation of adding the packet filter 2 to a PCC rule corresponding to the PCC rule identifier.

Optionally, if the terminal device requests the operation indication 7 from the SMF network element, the second message 2 includes a PCC rule identifier corresponding to the QoS rule identifier, the packet filter 3, and an operation indication 8 (which may also be referred to as an operation code 8) "Modify existing PCC rule and replace packet filters" corresponding to the operation indication 7, and is used to instruct the PCF network element to perform a modification operation of replacing, with the packet filter 3, a packet filter within a PCC rule corresponding to the PCC rule identifier.

Optionally, if the terminal device requests the operation indication 9 from the SMF network element, the second message 2 includes a PCC rule identifier corresponding to the QoS rule identifier, a PCC rule packet filter identifier 1 corresponding to the QoS rule packet filter identifier 1, and an operation indication 10 (which may also be referred to as an operation code 10) "Modify existing PCC rule and delete packet filters" corresponding to the operation indication 9, and is used to instruct the PCF network element to perform a modification operation of deleting the packet filter 1 within a PCC rule corresponding to the PCC rule identifier. For a related description of the PCC rule packet filter identifier 1, refer to the description in the embodiment shown in FIG. 5. Details are not described herein again.

Optionally, if the first message 1 includes the QoS parameter 1, the second message 2 may further include a QoS parameter 2 corresponding to the QoS parameter 1. For a related description of the QoS parameter 2, refer to the description in the embodiment shown in FIG. 5. Details are not described herein again.

S703: The PCF network element makes a policy decision.

Optionally, if the terminal device requests the operation indication 5 from the SMF network element, the PCF network element may modify the PCC rule based on the second message 2. The modified PCC rule includes the PCC rule identifier and an SDF template. The SDF template includes the packet filter 2 and a PCC rule packet filter identifier 2 allocated by the PCF network element to the packet filter 2. Optionally, if the PCC rule before the modification includes the packet filter 1 and the PCC rule packet filter identifier 1 allocated by the PCF network element to the packet filter 1, the SDF template includes the packet filter 1 and the PCC rule packet filter identifier 1 allocated by the PCF network element to the packet filter 1. In other words, both an existing packet filter and a PCC rule packet filter identifier allocated by the PCF network element to the packet filter are also included in the modified PCC rule.

Optionally, if the terminal device requests the operation indication 7 from the SMF network element, the PCF network element may modify the PCC rule based on the second message 2. The modified PCC rule includes the PCC rule identifier and an SDF template. The SDF template includes the packet filter 3 and a PCC rule packet filter identifier 3 allocated by the PCF network element to the packet filter 3. Optionally, if the PCC rule before the modification includes the packet filter 1 and the PCC rule packet filter identifier 1 allocated by the PCF network element to the packet filter 1, the SDF template does not include the packet filter 1 and the PCC rule packet filter identifier 1 allocated by the PCF network element to the packet filter 1. In other words, both an existing packet filter and a PCC rule packet filter identifier allocated by the PCF network element to the packet filter are replaced and not included in the modified PCC rule.

Optionally, if the terminal device requests the operation indication 9 from the SMF network element, the PCF network element may modify the PCC rule based on the second message 2. The modified PCC rule includes the PCC rule identifier and an SDF template. The SDF template does not include the PCC rule packet filter identifier 1 and the packet filter 1 corresponding to the PCC rule packet filter identifier 1. Certainly, the SDF template may further include another packet filter and a PCC rule packet filter identifier allocated by the PCF network element to the packet filter. This is not specifically limited herein.

Optionally, if the second message 2 further includes the QoS parameter 2, the PCF network element may further determine an adjusted QoS parameter (which may also be described as an authorized QoS parameter and is denoted as a QoS parameter 3). The modified PCC rule may further include the QoS parameter 3. For a related description of the QoS parameter 3, refer to the description in the embodiment shown in FIG. 5. Details are not described herein again.

S704: The PCF network element sends a third message 3 to the SMF network element, and the SMF network element receives the third message 3 from the PCF network element.

For example, the third message 3 may be, for example, an SM policy control update response message in FIG. 7.

The third message 3 may include the modified PCC rule, and the third message 3 is used to instruct the SMF network element to update, based on the modified PCC rule, the PCC rule corresponding to the PCC rule identifier.

S705: The SMF network element updates the PCC rule corresponding to the PCC rule identifier, and modifies the QoS rule corresponding to the PCC rule.

Optionally, if the terminal device requests the operation indication 5 from the SMF network element, the modified QoS rule may include the QoS rule identifier, the operation indication 5 "Modify existing QoS rule and add packet filters", and a packet filter set 2, and the packet filter set 2 includes the packet filter 2 and the QoS rule packet filter identifier 2 allocated by the SMF network element or the terminal device to the packet filter 2. Optionally, if the QoS rule before the modification includes the packet filter 1 and the QoS rule packet filter identifier 1 allocated by the SMF network element or the terminal device to the packet filter 1, the packet filter set 2 may further include the packet filter 1 and the QoS rule packet filter identifier 1 allocated by the SMF network element or the terminal device to the packet filter 1. In other words, both an existing packet filter and a QoS rule packet filter identifier allocated by the SMF network element or the terminal device to the packet filter are also included in the modified QoS rule.

Optionally, if the terminal device requests the operation indication 7 from the SMF network element, the modified QoS rule may include the QoS rule identifier, the operation indication 7 "Modify existing QoS rule and replace packet filters", and a packet filter set 3, and the packet filter set 3 includes the packet filter 3 and the QoS rule packet filter identifier 3 allocated by the SMF network element or the terminal device to the packet filter 3. Optionally, if the QoS rule before the modification includes the packet filter 1 and the QoS rule packet filter identifier 1 allocated by the SMF network element or the terminal device to the packet filter 1, the packet filter set 3 does not include the packet filter 1 and the QoS rule packet filter identifier 1 allocated by the SMF network element or the terminal device to the packet filter 1. In other words, both an existing packet filter and a QoS rule packet filter identifier allocated by the SMF network element or the terminal device to the packet filter are replaced and not included in the modified QoS rule.

Optionally, if the terminal device requests the operation indication 9 from the SMF network element, the modified QoS rule may include the QoS rule identifier, the operation indication 9 "Modify existing QoS rule and delete packet filters", and a packet filter set 4, and the packet filter set 4 does not include the packet filter 1 and the QoS rule packet filter identifier 1 allocated by the SMF network element or the terminal device to the packet filter 1.

Optionally, in this embodiment of this application, if the modified PCC rule includes the QoS parameter 3, the SMF network element may further determine a QoS parameter 4 corresponding to the QoS parameter 3. For a related description of the QoS parameter 4, refer to the description in the embodiment shown in FIG. 5. Details are not described herein again.

S706: The SMF network element sends a fourth message 4 to the terminal device, and the terminal device receives the fourth message 4 from the SMF network element.

For example, the fourth message 4 may be, for example, a PDU session modification response message in FIG. 7.

The fourth message 4 includes the modified QoS rule corresponding to the modified PCC rule, and the fourth message 4 is used to instruct the terminal device to update, based on the modified QoS rule, the QoS rule corresponding to the QoS rule identifier.

Optionally, if the SMF network element can determine the QoS parameter 4 corresponding to the QoS parameter 3, the fourth message 4 may further include QoS flow description information 4. The QoS flow description information 4 includes the QoS parameter 4, an identifier (that is, a QFI) of a QoS flow bound to the PCC rule, and indication information 5. The indication information 5 indicates a creation or modification operation. The QoS flow description information 4 is used to instruct the terminal device to modify, based on the QoS parameter 4, the QoS flow bound to the PCC rule.

After receiving the fourth message 4 from the SMF network element, the terminal device may update, based on the modified QoS rule, the QoS rule corresponding to the QoS rule identifier. Optionally, if the terminal device may obtain the QoS flow description information 4, the terminal device may modify, based on the QoS parameter 4 in the QoS flow description information 4, the QoS flow bound to the PCC rule. This is not specifically limited herein.

The embodiment shown in FIG. 7 provides an interaction procedure between the SMF network element and the PCF network element in a specific QoS handling procedure. The SMF network element may obtain the PCC rule identifier corresponding to the QoS rule identifier and the operation indication "Modify existing PCC rule and add/replace/delete packet filters" corresponding to the operation indication "Modify existing QoS rule and add/replace/delete packet filters", and add the PCC rule identifier and the operation indication "Modify existing PCC rule and add/replace/delete packet filters" to the second message 2 sent to the PCF network element, such that the PCF network element can modify the corresponding PCC rule based on the second message 2. Therefore, the policy control method provided in this embodiment of this application can support the SMF network element to perform policy authorization for the PCF network element in the specific QoS handling procedure.

The actions of the PCF network element or the actions of the SMF network element in steps S701 to S706 may be performed by the processor 401 of the communications device 400 shown in FIG. 4 by invoking the application program code stored in the memory 403. This is not limited in this embodiment.

Figure 8:
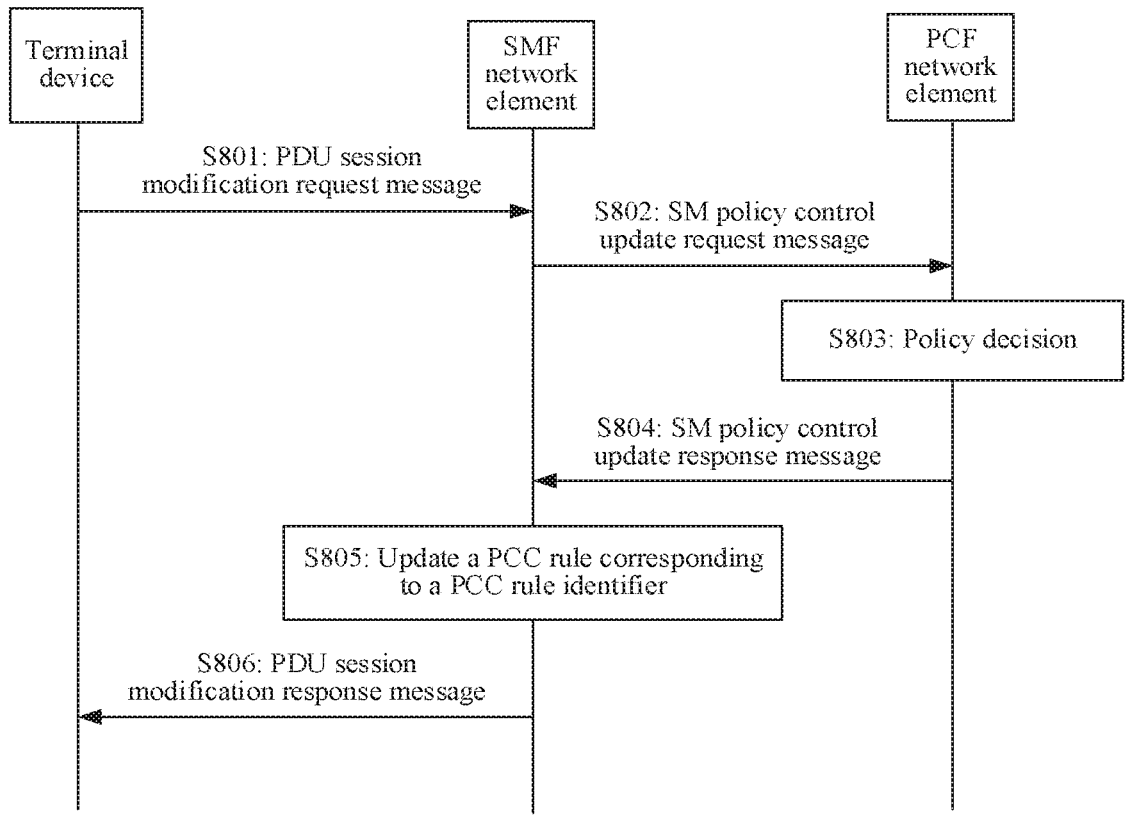
FIG. 8 is a schematic flowchart 4 of a policy control method according to an embodiment of this application.

Alternatively, for example, the communications system shown in FIG. 2 is applied to the 5G network architecture in the non-roaming scenario shown in FIG. 3A or FIG. 3B, and an operation indication requested by a terminal device from an SMF network element is modifying a PCC rule but without modifying a packet filter ("Modify existing QoS rule and without packet filters"). FIG. 8 shows a policy control method according to an embodiment of this application. The policy control method includes the following steps.

S801: The terminal device sends a first message 1 to the SMF network element, and the SMF network element receives the first message 1 from the terminal device.

For example, the first message 1 may be, for example, a PDU session modification request message in FIG. 8.

The first message 1 includes information used to indicate a requested QoS rule and a requested QoS parameter (which is denoted as a QoS parameter 1 herein), and is used to instruct the SMF network element to modify the QoS rule but without modifying a packet filter. For a related description of the QoS parameter 1, refer to the description in the embodiment shown in FIG. 5. Details are not described herein again. The information used to indicate the requested QoS rule may include, for example, an operation indication 11 (which may also be referred to as an operation code 11) "Modify existing QoS rule and without packet filters" and a corresponding QoS rule identifier.

S802: The SMF network element sends a second message 2 to a PCF network element, and the PCF network element receives the second message 2 from the SMF network element.

For example, the second message 2 may be, for example, an SM policy control update request message in FIG. 8.

The second message 2 includes a PCC rule identifier corresponding to the QoS rule identifier, a QoS parameter 2 corresponding to the QoS parameter 1, and an operation indication 12 (which may also be referred to as an operation code 12) "Modify existing PCC rule and without packet filters" corresponding to the operation indication 11, and is used to instruct the PCF network element to modify a PCC rule but without modifying a packet filter. For a related description of the QoS parameter 2, refer to the description in the embodiment shown in FIG. 5. Details are not described herein again.

S803: The PCF network element makes a policy decision.

The PCF network element may modify the PCC rule based on the second message 2. The modified PCC rule includes the PCC rule identifier and an adjusted QoS parameter (which may also be described as an authorized QoS parameter and is denoted as a QoS parameter 3). For a related description of the QoS parameter 3, refer to the description in the embodiment shown in FIG. 5. Details are not described herein again.

S804: The PCF network element sends a third message 3 to the SMF network element, and the SMF network element receives the third message 3 from the PCF network element.

For example, the third message 3 may be, for example, an SM policy control update response message in FIG. 8.

The third message 3 may include the modified PCC rule, and the third message 3 is used to instruct the SMF network element to update, based on the modified PCC rule, the PCC rule corresponding to the PCC rule identifier.

S805: The SMF network element updates the PCC rule corresponding to the PCC rule identifier.

In addition, in this embodiment of this application, the SMF network element may further determine a QoS parameter 4 corresponding to the QoS parameter 3. For a related description of the QoS parameter 4, refer to the description in the embodiment shown in FIG. 5. Details are not described herein again.

S806: The SMF network element sends a fourth message 4 to the terminal device, and the terminal device receives the fourth message 4 from the SMF network element.

For example, the fourth message 4 may be, for example, a PDU session modification response message in FIG. 8.

The fourth message 4 includes QoS flow description information 4, the QoS flow description information 4 includes the QoS parameter 4, an identifier (that is, a QFI) of a QoS flow bound to the PCC rule, and indication information 5, and the indication information 5 indicates a modification operation. The QoS flow description information 4 is used to instruct the terminal device to modify, based on the QoS parameter 4, the QoS flow bound to the PCC rule.

After receiving the fourth message 4 from the SMF network element, the terminal device may modify, based on the QoS parameter 4 in the QoS flow description information 4, the QoS flow bound to the PCC rule. This is not specifically limited herein.

The embodiment shown in FIG. 8 provides an interaction procedure between the SMF network element and the PCF network element in a specific QoS handling procedure. The SMF network element may obtain the PCC rule identifier corresponding to the QoS rule identifier and the operation indication "Modify existing PCC rule and without packet filters" corresponding to the operation indication "Modify existing QoS rule and without packet filters", and add the PCC rule identifier and the operation indication "Modify existing PCC rule and without packet filters" to the second message 2 sent to the PCF network element, such that the PCF network element can modify the corresponding PCC rule based on the second message 2. Therefore, the policy control method provided in this embodiment of this application can support the SMF network element to perform policy authorization for the PCF network element in the specific QoS handling procedure.

The actions of the PCF network element or the actions of the SMF network element in steps S801 to S806 may be performed by the processor 401 of the communications device 400 shown in FIG. 4 by invoking the application program code stored in the memory 403. This is not limited in this embodiment.

It should be noted that the embodiments shown in FIG. 5 to FIG. 8 are all described using the example in which the communications system shown in FIG. 2 is applied to the 5G network architecture in the non-roaming scenario shown in FIG. 3A or FIG. 3B. If an example in which the communications system shown in FIG. 2 is applied to a 5G network architecture in a roaming scenario is used for description, a corresponding policy control method is similar to the methods in the foregoing embodiments, and only a related network element needs to be adaptively replaced. Details are not described herein.

It may be understood that, in the foregoing embodiments, the methods and/or the steps that are implemented by the session management network element may also be implemented by a component that can be used on the session management network element.

The foregoing mainly describes the solutions provided in the embodiments of this application from a perspective of interaction between the network elements. Correspondingly, an embodiment of this application further provides a communications apparatus. The communications apparatus may be the session management network element in the foregoing method embodiments, or an apparatus including the session management network element, or a component that can be used on the session management network element. It may be understood that, to implement the foregoing functions, the communications apparatus includes a corresponding hardware structure and/or software module for performing each function. A person of ordinary skill in the art should be aware that, in combination with the examples described in the embodiments disclosed in this specification, units, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in this embodiment of this application, division into the modules is an example, is merely a logical function division and may be other division in an actual implementation.

Figure 9:
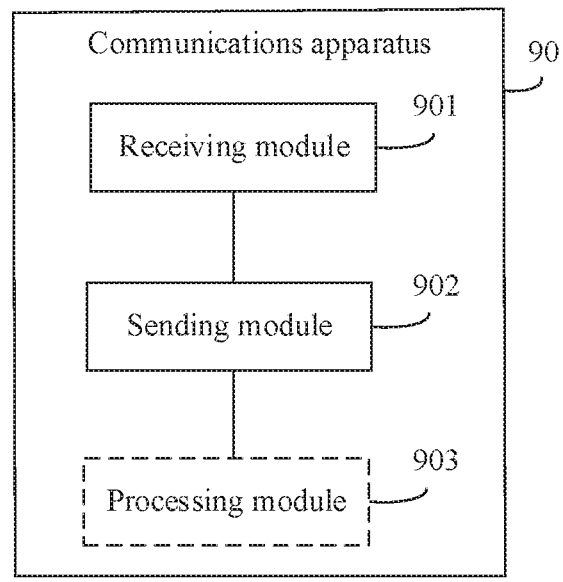
FIG. 9 is a schematic structural diagram of a communications apparatus according to an embodiment of this application.

For example, FIG. 9 is a schematic structural diagram of a communications apparatus 90. The communications apparatus 90 includes a receiving module 901 and a sending module 902. The receiving module 901 may also be referred to as a receiving unit, to implement a receiving function. For example, the receiving module 901 may be a receiver circuit, a receiver component, a receiver, or a communications interface. The sending module 902 may also be referred to as a sending unit, to implement a sending function. For example, the sending module 902 may be a transmitter circuit, a transmitter component, a transmitter, or a communications interface. Optionally, the communications apparatus 90 may further include a processing module 903.

For example, the communications apparatus 90 is the session management network element in the foregoing method embodiments.

The receiving module 901 is configured to receive a first message from a terminal device, where the first message includes a QoS rule identifier and a first operation indication. The sending module 902 is configured to send a second message to a policy control network element, where the second message includes a PCC rule identifier corresponding to the QoS rule identifier and a second operation indication corresponding to the first operation indication, and is used to request the policy control network element to perform, on a PCC rule corresponding to the PCC rule identifier, a second operation indicated by the second operation indication.

In a possible implementation, the first operation indication includes deleting a QoS rule, the second operation indication includes deleting a PCC rule, and the second operation indicated by the second operation indication includes an operation of deleting the PCC rule.

Optionally, the receiving module 901 is further configured to receive a third message from the policy control network element, where the third message includes the PCC rule identifier and first indication information, the first indication information indicates a deletion operation, and the third message is used to instruct the session management network element to delete the PCC rule. The sending module 902 is further configured to send a fourth message to the terminal device, where the fourth message includes the QoS rule corresponding to the PCC rule, the QoS rule includes the QoS rule identifier and the first operation indication, and the fourth message is used to instruct the terminal device to delete the QoS rule.

Optionally, the processing module 903 is configured to determine to delete a QoS flow bound to the PCC rule. Correspondingly, the fourth message further includes first QoS flow description information, the first QoS flow description information includes an identifier of the QoS flow and second indication information, the second indication information is used to indicate deletion of the QoS flow, and the fourth message is further used to instruct the terminal device to delete the QoS flow.

Optionally, the processing module 903 is configured to determine to modify a QoS flow bound to the PCC rule. Correspondingly, the fourth message further includes second QoS flow description information, the second QoS flow description information includes an identifier of the QoS flow, third indication information, and an adjusted QoS parameter corresponding to the QoS flow, the third indication information indicates a modification operation, and the fourth message is further used to instruct the terminal device to modify the QoS flow based on the adjusted QoS parameter.

In another possible implementation, the first operation indication includes modifying a QoS rule and adding a packet filter, the second operation indication includes modifying a PCC rule and adding a packet filter, and the second operation indicated by the second operation indication includes a modification operation of adding a packet filter to the PCC rule. Correspondingly, the first message further includes a first packet filter, and the second message further includes the first packet filter.

In still another possible implementation, the first operation indication includes modifying a QoS rule and replacing a packet filter, the second operation indication includes modifying a PCC rule and replacing a packet filter, and the second operation indicated by the second operation indication includes a modification operation of replacing a packet filter within the PCC rule. Correspondingly, the first message further includes a first packet filter, and the second message further includes the first packet filter.

Optionally, the receiving module 901 is further configured to receive a fifth message from the policy control network element, where the fifth message includes a modified PCC rule, the modified PCC rule includes the PCC rule identifier and the first packet filter, and the fifth message is used to instruct the session management network element to update, based on the modified PCC rule, the PCC rule corresponding to the PCC rule identifier. The sending module 902 is further configured to send a sixth message to the terminal device, where the sixth message includes a modified QoS rule corresponding to the modified PCC rule, the modified QoS rule includes the QoS rule identifier, the first operation indication, and a first packet filter set, the first packet filter set includes the first packet filter, and the sixth message is used to instruct the terminal device to update, based on the modified QoS rule, the QoS rule corresponding to the QoS rule identifier.

In still another possible implementation, the first operation indication includes modifying a QoS rule and deleting a packet filter, the second operation indication includes modifying a PCC rule and deleting a packet filter, and the second operation indicated by the second operation indication includes a modification operation of deleting a packet filter within the PCC rule. Correspondingly, the first message further includes a first identifier of a to-be-deleted second packet filter, the second message further includes a second identifier of the second packet filter, the first identifier is used to identify the second packet filter within the QoS rule, and the second identifier is used to identify the second packet filter within the PCC rule.

Optionally, the receiving module 901 is further configured to receive a seventh message from the policy control network element, where the seventh message includes a modified PCC rule, the modified PCC rule includes the PCC rule identifier, the modified PCC rule does not include the second packet filter, and the seventh message is used to instruct the session management network element to update, based on the modified PCC rule, the PCC rule corresponding to the PCC rule identifier. The sending module 902 is further configured to send an eighth message to the terminal device, where the eighth message includes a modified QoS rule corresponding to the modified PCC rule, the modified QoS rule includes the QoS rule identifier, the first operation indication, and a second packet filter set, the second packet filter set does not include the second packet filter, and the eighth message is used to instruct the terminal device to update, based on the modified QoS rule, the QoS rule corresponding to the QoS rule identifier.

In still another possible implementation, the first operation indication includes modifying a QoS rule but without modifying a packet filter, the second operation indication includes modifying a PCC rule but without modifying a packet filter, and the second operation indicated by the second operation indication includes an operation of modifying a QoS parameter within the PCC rule. Correspondingly, the first message further includes a requested first QoS parameter, the second message further includes a second QoS parameter corresponding to the first QoS parameter, and the second QoS parameter is used to determine an adjusted second QoS parameter.

Optionally, the receiving module 901 is further configured to receive a ninth message from the policy control network element, where the ninth message includes a modified PCC rule, the modified PCC rule includes the PCC rule identifier and the adjusted second QoS parameter, and the ninth message is used to instruct the session management network element to update, based on the modified PCC rule, the PCC rule corresponding to the PCC rule identifier. The sending module 902 is further configured to send a tenth message to the terminal device, where the tenth message includes fifth QoS flow description information, the fifth QoS flow description information includes an identifier of a QoS flow bound to the PCC rule, sixth indication information, and an adjusted first QoS parameter corresponding to the adjusted second QoS parameter, the sixth indication information indicates a modification operation, and the tenth message is used to instruct the terminal device to modify the QoS flow based on the adjusted first QoS parameter.

Optionally, the receiving module 901 is further configured to receive an eleventh message from the terminal device, where the eleventh message includes a third packet filter and a third operation indication, the third operation indication includes creating the QoS rule, and the eleventh message is used to instruct the session management network element to create the QoS rule. The sending module 902 is further configured to send a twelfth message to the policy control network element, where the twelfth message includes the third packet filter and a fourth operation indication corresponding to the third operation indication, the fourth operation indication includes creating the PCC rule, and the twelfth message is used to instruct the policy control network element to create the PCC rule. The receiving module 901 is further configured to receive a thirteenth message from the policy control network element, where the thirteenth message includes the created PCC rule, the PCC rule includes the PCC rule identifier and the third packet filter, and the thirteenth message is used to instruct the session management network element to install the created PCC rule. The sending module 902 is further configured to send a fourteenth message to the terminal device, where the fourteenth message includes the created QoS rule corresponding to the PCC rule, the QoS rule includes the QoS rule identifier, the third operation indication, and a third packet filter set, the third packet filter set includes the third packet filter, and the fourteenth message is used to instruct the terminal device to install the created QoS rule.

All related content of the steps in the foregoing method embodiments may be cited in function descriptions of the corresponding functional modules. Details are not described herein again.

In this embodiment, the communications apparatus 90 is presented in a form of functional modules obtained through integration. The "module" herein may be a specific ASIC, a circuit, a processor executing one or more software or firmware programs and a memory, an integrated logic circuit, and/or another device that can provide the foregoing functions. In an embodiment, the communications apparatus 90 may use the simple structure of the communications device 400 shown in FIG. 4.

For example, the processor 401 of the communications device 400 shown in FIG. 4 may invoke the computer-executable instruction stored in the memory 403, to enable the network device 400 to perform the policy control methods in the foregoing method embodiments.

For example, functions/implementation processes of the receiving module 901, the sending module 902, and the processing module 903 in FIG. 9 may be implemented by the processor 401 of the communications device 400 shown in FIG. 4 by invoking the computer-executable instruction stored in the memory 403. Alternatively, a function/implementation process of the processing module 903 in FIG. 9 may be implemented by the processor 401 of the communications device 400 shown in FIG. 4 by invoking the computer-executable instruction stored in the memory 403, and functions/implementation processes of the receiving module 901 and the sending module 902 in FIG. 9 may be implemented by the communications interface 404 of the communications device 400 shown in FIG. 4.

The communications apparatus 90 provided in this embodiment may perform the foregoing policy control methods. Therefore, for technical effects that can be achieved by the communications apparatus 90, refer to the foregoing method embodiments. Details are not described herein again.

It should be noted that one or more of the foregoing modules or units may be implemented by software, hardware, or a combination thereof. When any one of the foregoing modules or units is implemented by software, the software exists in a form of a computer program instruction, and is stored in a memory. A processor may be configured to execute the program instruction to implement the foregoing method procedures. The processor may be integrated in a system on chip (SoC) or an ASIC, or may be an independent semiconductor chip. In addition to a core that is configured to execute a software instruction to perform calculation or processing, the processor may further include a necessary hardware accelerator, for example, a field programmable gate array (FPGA), a programmable logic device (PLD), or a logic circuit that implements dedicated logic calculation.

When the foregoing modules or units are implemented by hardware, the hardware may be any one of or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, or a non-integrated discrete device, and the hardware may run necessary software or does not depend on software, to perform the foregoing method procedures.

Optionally, an embodiment of this application further provides a communications apparatus (for example, the communications apparatus may be a chip or a chip system). The communications apparatus includes a processor configured to implement the method in any one of the foregoing method embodiments. In a possible design, the communications apparatus further includes a memory. The memory is configured to store a necessary program instruction and necessary data. The processor may invoke program code stored in the memory, to instruct the communications apparatus to perform the method in any one of the foregoing method embodiments. Certainly, the communications apparatus may not include the memory. When the communications apparatus is a chip system, the communications apparatus may include a chip, or may include a chip and another discrete device. This is not specifically limited in this embodiment of this application.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, "comprise (comprising)" does not exclude another component or another step, and "a" or "one" does not exclude a meaning of plurality. A single processor or another unit may implement several functions enumerated in the claims. Some measures are recorded in dependent claims that are different from each other. However, this does not mean that these measures cannot be combined to produce a better effect.

Although this application is described with reference to features and the embodiments thereof, it is clear that various modifications and combinations may be made to the features and the embodiments without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that various modifications and variations may be made to this application without departing from the spirit and scope of this application. This application is intended to cover these modifications and variations of this application provided that these modifications and variations fall within the scope of protection defined by the following claims and equivalent technologies thereof.

What is claimed is:

1. A policy control method comprising:
   receiving, by a session management device, a first message from a terminal device, wherein the first message is a protocol data unit (PDU) session modification request message, and wherein the first message comprises a quality of service (QoS) rule identifier and a first operation indication, wherein the first operation indication indicates creating, deleting, or modifying a QoS rule identified by the QoS rule identifier;
   sending, by the session management device, a second message to a policy control device, wherein the second message comprises a policy and charging control (PCC) rule identifier corresponding to the QoS rule identifier and a second operation indication corresponding to the first operation indication, wherein the second operation indication indicates creating, deleting, modifying a PCC rule identified by the PCC rule identifier;
   receiving, by the policy control device, the second message; and
   performing, by the policy control device, on a PCC rule corresponding to the PCC rule identifier, a second operation indicated by the second operation indication by creating, deleting, or modifying the PCC rule.

2. The policy control method of claim 1, further comprising performing, by the session management device, a first operation indicated in the first operation indication by modifying the QoS rule and adding a packet filter, wherein the second operation indication indicates modifying the PCC rule and adding a new packet filter, wherein performing the second operation comprises adding the new packet filter to the PCC rule, wherein the first message further comprises a first packet filter, and wherein the second message further comprises the first packet filter.

3. The policy control method of claim 1, wherein the first operation indication indicates modifying the QoS rule and replacing a packet filter, wherein the second operation indication indicates modifying the PCC rule and replacing an existing packet filter, wherein performing the second operation comprises replacing the packet filter within the PCC rule, wherein the first message further comprises a first packet filter, and wherein the second message further comprises the first packet filter.

4. The policy control method of claim 1, wherein the first operation indication indicates modifying the QoS rule and deleting a packet filter, wherein the second operation indication indicates modifying the PCC rule and deleting an existing packet filter, wherein performing the second operation comprises deleting the existing packet filter within the PCC rule, wherein the first message further comprises a first identifier of a second packet filter that is to be deleted, wherein the second message further comprises a second identifier of the second packet filter, wherein the first identifier identifies the second packet filter within the QoS rule, and wherein the second identifier identifies the second packet filter within the PCC rule.

5. The policy control method of claim 1, wherein the first operation indication indicates modifying the QoS rule without modifying packet filters, wherein the second operation indication indicates modifying the PCC rule without modifying a packet filter, wherein performing the second operation comprises modifying a QoS parameter within the PCC rule, wherein the first message further comprises a first QoS parameter that is requested, wherein the second message further comprises a second QoS parameter corresponding to the first QoS parameter, and wherein the second QoS parameter determines an adjusted second QoS parameter.

6. The policy control method of claim 1, further comprising:
receiving, by the session management device, an eleventh message from the terminal device, wherein the eleventh message comprises a third packet filter and a third operation indication, wherein the third operation indication indicates creating the QoS rule, and wherein the eleventh message instructs the session management device to create the QoS rule;
sending, by the session management device, a twelfth message to the policy control device, wherein the twelfth message comprises the third packet filter and a fourth operation indication corresponding to the third operation indication, wherein the fourth operation indication comprises creating the PCC rule;
receiving, by the policy control device, the twelfth message;
sending, by the policy control device, a thirteenth message to the session management device, wherein the thirteenth message comprises a new PCC rule created according to the twelfth message, wherein the new PCC rule comprises the PCC rule identifier and the third packet filter;
receiving, by the session management device, the thirteenth message from the policy control device, wherein the thirteenth message instructs the session management device to install the new PCC rule; and
sending, by the session management device, a fourteenth message to the terminal device, wherein the fourteenth message comprises the QoS rule corresponding to the PCC rule, wherein the QoS rule comprises the QoS rule identifier, the third operation indication, and a third packet filter set, wherein the third packet filter set comprises the third packet filter, and wherein the fourteenth message instructs the terminal device to install the QoS rule.

7. The policy control method of claim 1, wherein the first message further comprises a first QoS parameter that is requested by the terminal device, wherein the second message further comprises a second QoS parameter corresponding to the first QoS parameter, and wherein the policy control method further comprises determining, by the policy control device, an adjusted second QoS parameter based on the second QoS parameter in the second message from the session management device.

8. A session management device comprising:
a memory configured to store instructions; and
at least one processor coupled to the memory and configured to execute the instructions to cause the session management device to:
receive a first message from a terminal device, wherein the first message is a protocol data unit (PDU) session modification request message, and wherein the first message comprises a quality of service (QoS) rule identifier and a first operation indication, wherein the first operation indication indicates creating deleting, or modifying a QoS rule identified by the QoS role identifier; and
send a second message to a policy control device,
wherein the second message comprises a policy and charging control (PCC) rule identifier corresponding to the QoS rule identifier and a second operation indication corresponding to the first operation indication,
wherein the second operation indication indicates creating, deleting, or modifying a PCC rule identified by the PCC rule identifier, and
wherein the second message requests the policy control device to perform, on a PCC rule corresponding to the PCC rule identifier, a second operation indicated by the second operation indication by creating, deleting, or modifying the PCC rule.

9. The session management device of claim 8, wherein the processor is further configured to execute the instructions to cause the session management device to perform a first operation by modifying the QoS rule and adding a packet filter, wherein the second operation indication requests the policy control device to perform the second operation by modifying the PCC rule and adding a new packet filter, wherein performing the second operation comprises adding the new packet filter to the PCC rule, wherein the first message further comprises a first packet filter, and wherein the second message further comprises the first packet filter.

10. The session management device of claim 8, wherein the first operation indication indicates modifying the QoS rule and replacing a packet filter, wherein the second operation indication indicates modifying the PCC rule and replacing an existing packet filter, wherein performing the second operation comprises replacing the existing packet filter within the PCC rule, wherein the first message further comprises a first packet filter, and wherein the second message further comprises the first packet filter.

11. The session management device of claim 8, wherein the first operation indication indicates modifying the QoS rule and deleting a packet filter, wherein the second operation indication indicates modifying the PCC rule and deleting an existing packet filter, wherein performing the second operation comprises deleting the existing packet filter within the PCC rule, wherein the first message further comprises a first identifier of a second packet filter that is to be deleted, wherein the second message further comprises a second identifier of the second packet filter, wherein the first identifier identifies the second packet filter within the QoS rule, and wherein the second identifier identifies the second packet filter within the PCC rule.

12. The session management device of claim 8, wherein the first operation indication indicates modifying the QoS rule without modifying packet filters, wherein the second operation indication indicates modifying the PCC rule without modifying a packet filter, wherein performing the second operation comprises modifying a QoS parameter within the PCC rule, wherein the first message further comprises a first QoS parameter that is requested, wherein the second message further comprises a second QoS parameter corresponding to the first QoS parameter, and wherein the second QoS parameter determines an adjusted second QoS parameter.

13. A communications system comprising:
a session management device configured to:
receive a first message from a terminal device, wherein the first message is a protocol data unit (PDU) session modification request message, and wherein the first message comprises a quality of service (QoS) rule identifier and a first operation indication, wherein the first operation indication indicates creating, deleting, or modifying a QoS rule identified by the QoS rule identifier; and
send a second message, wherein the second message comprises a policy and charging control (PCC) rule identifier corresponding to the QoS rule identifier and a second operation indication corresponding to the first operation indication, wherein the second operation indication indicates creating, deleting, or modifying a PCC rule identified b the PCC rule identifier; and
a policy control device configured to:
receive the second message from the session management device; and
perform, on a PCC rule corresponding to the PCC rule identifier, a second operation indicated by the second operation indication by creating, deleting, or modifying the PCC rule.

14. The communications system of claim 13, wherein the session management device is further configured to perform a first operation indicated by the first operation indication by modifying the QoS rule and adding a packet filter, wherein the second operation indication indicates modifying the PCC rule and adding a new packet filter, wherein the policy control device is further configured to perform the second operation by adding the new packet filter to the PCC rule, wherein the first message further comprises a first packet filter, and wherein the second message further comprises the first packet filter.

15. The communications system of claim 13, wherein the first operation indication indicates modifying the QoS rule and replacing a packet filter, wherein the second operation indication indicates modifying the PCC rule and replacing an existing packet filter, wherein performing the second operation comprises replacing the existing packet filter within the PCC rule, wherein the first message further comprises a first packet filter, and wherein the second message further comprises the first packet filter.

16. The communications system of claim 13, wherein the first operation indication indicates modifying the QoS rule and deleting a packet filter, wherein the second operation indication indicates modifying the PCC rule and deleting an existing packet filter, wherein performing the second operation comprises deleting the existing packet filter within the PCC rule, wherein the first message further comprises a first identifier of a second packet filter that is to be deleted, wherein the second message further comprises a second identifier of the second packet filter, wherein the first identifier identifies the second packet filter within the QoS rule, and wherein the second identifier identifies the second packet filter within the PCC rule.

17. The communications system of claim 13, wherein the first operation indication indicates modifying the QoS rule without modifying packet filters, wherein the second operation indication indicates modifying the PCC rule without modifying a packet filter, and wherein the policy control device is further configured to perform the second operation by modifying a QoS parameter within the PCC rule.

18. The communications system of claim 13, wherein the first message further comprises a first QoS parameter that is requested by the terminal device, wherein the second message further comprises a second QoS parameter corresponding to the first QoS parameter, and wherein the policy control device is further configured to determine an adjusted second QoS parameter based on the second QoS parameter in the second message from the session management device.

19. The communications system of claim 13, wherein the session management device is further configured to:
receive an eleventh message from the terminal device, wherein the eleventh message comprises a third packet filter and a third operation indication, wherein the third operation indication indicates creating the QoS rule, and wherein the eleventh message instructs the session management device to create the QoS rule; and
send a twelfth message to the policy control device, wherein the twelfth message comprises the third packet filter and a fourth operation indication corresponding to the third operation indication, wherein the fourth operation indication indicates creating the PCC rule,
wherein the policy control device is further configured to:
receive the twelfth message; and
send a thirteenth message to the session management device, wherein the thirteenth message comprises a new PCC rule created according to the twelfth message, wherein the new PCC rule comprises the PCC rule identifier and the third packet filter, and wherein the session management device is further configured to:
receive the thirteenth message from the policy control device, wherein the thirteenth message instructs the session management device to install the new PCC rule; and
send a fourteenth message to the terminal device, wherein the fourteenth message comprises the QoS rule corresponding to the PCC rule, wherein the QoS rule comprises the QoS rule identifier, the third operation indication, and a third packet filter set, wherein the third packet filter set comprises the third packet filter, and wherein the fourteenth message instructs the terminal device to install the QoS rule.

20. A policy control method implemented by a session management device and comprising:
receiving a first message from a terminal device, wherein the first message is a protocol data unit (PDU) session modification request message, and wherein the first message comprises a quality of service (QoS) rule identifier and a first operation indication, wherein the first operation indication indicates creating, deleting, or modifying a QoS rule identified by the QoS rule identifier; and sending a second message to a policy control device,
wherein the second message comprises a policy and charging control (PCC) rule identifier corresponding to the QoS rule identifier and a second operation indication corresponding to the first operation indication,
wherein the second operation indication indicates creating, deleting, or modifying a PCC rule identified by the PCC rule identifier, and
wherein the second message requests the policy control device to perform, on a PCC rule corresponding to the PCC rule identifier, a second operation indicated by the second operation indication by creating, deleting, or modifying the PCC rule.

21. The policy control method of claim 20, further comprising performing a first operation by modifying the QoS rule and adding a packet filter, wherein the second operation indication requests the policy control device to perform the second operation by modifying the PCC rule and adding a new packet filter, wherein performing the second operation comprises adding the new packet filter to the PCC rule, wherein the first message further comprises a first packet filter, and wherein the second message further comprises the first packet filter.

22. The policy control method of claim 20, wherein the first operation indication indicates modifying the QoS rule and replacing a packet filter, wherein the second operation indication indicates modifying the PCC rule and replacing an existing packet filter, wherein performing the second operation comprises replacing the existing packet filter within the PCC rule, wherein the first message further comprises a first packet filter, and wherein the second message further comprises the first packet filter.

23. The policy control method of claim 20, wherein the first operation indication indicates modifying the QoS rule and deleting a packet filter, wherein the second operation indication indicates modifying the PCC rule and deleting an existing packet filter, wherein performing the second operation comprises deleting the existing packet filter within the PCC rule, wherein the first message further comprises a first identifier of a second packet filter that is to be deleted, wherein the second message further comprises a second identifier of the second packet filter, wherein the first identifier identifies the second packet filter within the QoS rule, and wherein the second identifier identifies the second packet filter within the PCC rule.

24. The policy control method of claim 20, wherein the first operation indication indicates modifying the QoS rule without modifying packet filters, wherein the second operation indication indicates modifying the PCC rule without modifying a packet filter, wherein performing the second operation comprises modifying a QoS parameter within the PCC rule, wherein the first message further comprises a first QoS parameter that is requested, wherein the second message further comprises a second QoS parameter corresponding to the first QoS parameter, and wherein the second QoS parameter determines an adjusted second QoS parameter.

* * * * *

UNITED STATES PATENT AND TRADEMARK OFFICE
CERTIFICATE OF CORRECTION

PATENT NO. : 11,582,350 B2
APPLICATION NO. : 16/890728
DATED : February 14, 2023
INVENTOR(S) : Xiaoyun Zhou and Yali Yan It is certified that error appears in the above-identified patent and that said Letters Patent is hereby corrected as shown below:

In the Claims

Claim 1, Column 28, Line 52: "modifying a PCC" should read "or modifying a PCC"

Claim 13, Column 31, Line 34: "identified b the" should read "identified by the"

Signed and Sealed this
Eleventh Day of April, 2023

Katherine Kelly Vidal
*Director of the United States Patent and Trademark Office*